US010532378B2

(12) United States Patent
Quill et al.

(10) Patent No.: US 10,532,378 B2
(45) Date of Patent: Jan. 14, 2020

(54) ACID-REDUCING BEVERAGE FILTER AND METHOD OF PRODUCING SAME

(71) Applicant: PHAM Products LLC, Atlanta, GA (US)

(72) Inventors: Tyler Quill, Grayson, GA (US); Aaron Payne Stansell, Homewood, AL (US); Lucas Robert Votaw, Herndon, VA (US); Michele Rama Lauto, Scottsdale, AZ (US); Frederick Scott Gray, Delmar, NY (US)

(73) Assignee: PHAM PRODUCTS LLC, Atlanta, GA (US)

(*) Notice: Subject to any disclaimer, the term of this patent is extended or adjusted under 35 U.S.C. 154(b) by 0 days.

(21) Appl. No.: 16/296,031

(22) Filed: Mar. 7, 2019

(65) Prior Publication Data
US 2019/0274328 A1 Sep. 12, 2019

Related U.S. Application Data

(60) Provisional application No. 62/769,294, filed on Nov. 19, 2018, provisional application No. 62/639,869, filed on Mar. 7, 2018.

(51) Int. Cl.
B05D 7/24 (2006.01)
A23F 5/22 (2006.01)
(Continued)

(52) U.S. Cl.
CPC .............. B05D 7/24 (2013.01); A23F 3/26 (2013.01); A23F 3/363 (2013.01); A23F 3/40 (2013.01);
(Continued)

(58) Field of Classification Search
CPC ......... A47J 31/08; B01D 37/00; B01D 39/02; B01D 39/14; B05D 7/24; B05D 2203/22; A23F 3/36; A23F 3/363; A23F 3/40; A23F 5/16; A23F 5/20; A23F 5/202; A23F 5/46; A23L 2/72
See application file for complete search history.

(56) References Cited

U.S. PATENT DOCUMENTS 4,212,733 A * 7/1980 Goto .................... B01D 17/045
210/505
6,102,213 A * 8/2000 Gurol ........................ A23F 5/14
210/500.1
(Continued)

FOREIGN PATENT DOCUMENTS

CN        105836870 A  *  8/2016

OTHER PUBLICATIONS

International Search Report and Written Opinion dated May 13, 2019 in International Patent Application No. PCT/US19/21223.

Primary Examiner — William P Fletcher, III
(74) Attorney, Agent, or Firm — Morris, Manning & Martin, LLP; Bryan D. Stewart

(57) ABSTRACT

The present technology provides a method for preparing an acid-reducing filter that includes depositing a mineral blend layer to a filter substrate, where the mineral blend layer comprises calcium carbonate and magnesium carbonate at a weight ratio of about 1:10 to about 10:1, the mineral blend is free of soluble halide or hydroxide salts of alkali or alkaline earth metals, and the mineral blend layer is insoluble in water.

18 Claims, 15 Drawing Sheets

(51) Int. Cl.
| | | |
|---|---|---|
| *B01D 37/02* | (2006.01) | |
| *A47J 31/08* | (2006.01) | |
| *A23F 3/40* | (2006.01) | |
| *A23F 5/16* | (2006.01) | |
| *A23F 3/36* | (2006.01) | |
| *A23F 5/20* | (2006.01) | |
| *A23F 5/46* | (2006.01) | |
| *A23F 3/26* | (2006.01) | |
| *A23L 2/72* | (2006.01) | |
| *B01D 39/14* | (2006.01) | |
| *B01D 39/02* | (2006.01) | |

(52) U.S. Cl.
CPC ............... *A23F 5/16* (2013.01); *A23F 5/20* (2013.01); *A23F 5/202* (2013.01); *A23F 5/22* (2013.01); *A23F 5/46* (2013.01); *A23L 2/72* (2013.01); *A47J 31/08* (2013.01); *B01D 37/02* (2013.01); *B01D 39/02* (2013.01); *B01D 39/14* (2013.01); *B05D 2203/22* (2013.01)

(56) References Cited

U.S. PATENT DOCUMENTS

| | | | |
|---|---|---|---|
| 6,461,650 B1 | 10/2002 | Remesy | |
| 6,495,180 B1 * | 12/2002 | Gurol | A23F 5/14 426/309 |
| 2002/0122847 A1 * | 9/2002 | Nunes | A23L 2/52 426/72 |
| 2004/0129632 A1 | 7/2004 | Le Brech et al. | |
| 2005/0061733 A1 | 3/2005 | Bentz et al. | |
| 2005/0214433 A1 * | 9/2005 | Hardesty | A23F 5/243 426/594 |
| 2010/0331457 A1 | 12/2010 | Buri et al. | |
| 2016/0199752 A1 | 7/2016 | Farr et al. | |

* cited by examiner

ACID-REDUCING BEVERAGE FILTER AND METHOD OF PRODUCING SAME

CROSS REFERENCE TO RELATED APPLICATIONS

This application claims the benefit of and priority under 35 U.S.C. §§ 119, 120 to:

U.S. Provisional Patent Application No. 62/639,869, filed Mar. 7, 2018, entitled, "Reducing Acidity of Beverages in Brew Process"; and U.S. Provisional Patent Application No. 62/769,294, filed Nov. 19, 2018, entitled, "Acid-Reducing Beverage Filter and Method of Producing Same;" each of which is incorporated herein by reference in its entirety.

FIELD

The present technology relates generally to methods of manufacturing beverage filters for reducing the acidity of a beverage. More particularly, and not by way of limitation, the present technology relates to methods of making an acid-reducing beverage filter, which includes a mineral blend layer, and use of the beverage filter to reduce the acidity of a beverage, such as, coffee or tea.

BACKGROUND

There exists methods of coffee filter production where a water-soluble salt is incorporated into a coffee filter for the goal of adjusting the pH. However, soluble materials dissolve in the cellulose suspension during typical paper filter preparation methods. In addition, when pH reducing compounds are water soluble (such as alkali metal hydroxide salts, etc.), control over the final pH of the beverage (e.g., coffee) is lost since the acid reducing method and the resulting pH are not hindered by any kinetic or thermodynamic steps. Because soluble materials will readily and rapidly dissolve in aqueous solution, there exists no control over the amount of the pH reducing compounds present in the paper filter during manufacture or dissolved into a beverage during use. Therefore, no pH control can be achieved. The present technology is directed to overcoming these and other deficiencies.

SUMMARY

In an aspect of the present technology, a method for preparing an acid-reducing filter is provided that includes depositing a mineral blend layer to a filter substrate; where the mineral blend layer includes calcium carbonate and magnesium carbonate at a weight ratio of about 1:10 to about 10:1, the mineral blend is free of soluble halide or hydroxide salts of alkali or alkaline earth metals, and the mineral blend layer is insoluble in water.

In another aspect of the present technology, a method is provided for preparing an acid-reducing filter that includes combining a mineral blend and a solvent to obtain a material matrix; depositing a layer of the material matrix to a substrate; and separating the solvent from the material matrix; where the mineral blend includes calcium carbonate, magnesium carbonate, and insoluble fiber materials, and the mineral blend has a weight ratio of calcium carbonate to magnesium carbonate of about 1:10 to about 10:1 by weight of the mineral blend, and the mineral blend is insoluble in water.

In another aspect of the present technology, a method is provided for preparing an acid-reducing filter that includes combining a mineral blend and a filter substrate, wherein the mineral blend and the filter substrate form a homogenous mixture. Thus, the acid-reducing filter produced by the method includes the mineral blend as an integrally formed, homogenously distributed material.

In a related aspect of the preset technology, an acid-reducing filter is provided that is prepared according to any of the methods described herein in any embodiment.

In another related aspect of the present technology, a process for preparing an acid-reduced liquid beverage is provided that includes: contacting a solid beverage material with an acid-reducing filter; contacting the solid beverage material and acid-reducing filter with a liquid to form a beverage matrix comprising the solid beverage material and liquid; and separating the solid beverage material from the beverage matrix to obtain the acid-reduced liquid beverage; where the acid-reducing filter is prepared according to any method described herein in any embodiment, and the liquid beverage has a change in pH of about 0.3 to about 1.5 pH units higher than a liquid beverage prepared without the acid-reducing filter.

According to a first aspect, a method for preparing an acid-reducing filter including: A) depositing a mineral blend layer to a filter substrate, wherein: 1) the mineral blend layer includes calcium carbonate and magnesium carbonate at a weight ratio of about 1:10 to about 10:1; 2) the mineral blend is free of soluble halide or hydroxide salts of alkali or alkaline earth metals; and 3) the mineral blend layer is insoluble in water.

According to a second aspect, the method of the first aspect or any other aspect, wherein the calcium carbonate is present in an amount from about 25 wt % to about 40 wt % of the mineral blend layer.

According to a third aspect, the method of the second aspect or any other aspect, wherein the magnesium carbonate is present in an amount from about 60 wt % to about 75 wt % of the mineral blend layer.

According to a fourth aspect, the method of the third aspect or any other aspect, wherein the magnesium carbonate and calcium carbonate of the mineral blend layer are present in approximate amounts of 66 wt % and 33 wt %, respectively, and wherein the acid-reducing filter includes a filter permeability of about $2.7 \times 10^{-8}$ cm$^2$.

According to a fifth aspect, the method of the third aspect or any other aspect, wherein the mineral blend further includes insoluble fiber materials selected from the group consisting of virgin bleached cellulose fibers, virgin unbleached cellulose fibers, recycled unbleached cellulose fibers, hemp, synthetic fibers, nylon, biofibers, or mixtures of two or more thereof.

According to a sixth aspect, the method of the fifth aspect or any other aspect, wherein the method further includes depositing one or more coating layers including insoluble fiber materials.

According to a seventh aspect, the method of the sixth aspect or any other aspect, wherein the method further includes: A) depositing a first coating layer to the filter substrate before depositing the mineral blend layer; and B) depositing a second coating layer to the mineral blend layer, wherein: 1) the mineral blend layer is disposed between the first coating layer and the second coating layer; and 2) the first coating layer and the second coating layer include insoluble fiber materials.

According to an eighth aspect, the method of the seventh aspect or any other aspect wherein the filter substrate is a coffee filter paper.

According to a ninth aspect, the method of the first aspect or any other aspect, wherein the acid reducing filter produced includes a flow rate from about 5.0-10.0 milliliters per second.

According to a tenth aspect, a method for preparing an acid-reducing filter including: A) combining a mineral blend including calcium carbonate, magnesium carbonate, and insoluble fiber materials with a solvent to obtain a material matrix; B) depositing a layer of the material matrix to a substrate; and C) separating the solvent from the material matrix, wherein: the mineral blend has a weight ratio of calcium carbonate to magnesium carbonate of about 1:10 to about 10:1 by weight of the mineral blend, is free of soluble halide or hydroxide salts of alkali or alkaline earth metals, and is insoluble in water.

According to an eleventh aspect, the method of the tenth aspect or any other aspect, wherein the magnesium carbonate and calcium carbonate of the mineral blend are present in amounts ranging from about 60 wt % to about 75 wt %, and about 25 wt % to about 40 wt %, respectively, and wherein the acid-reducing filter includes a filter permeability of about $2.7 \times 10^{-8}$ cm$^2$.

According to a twelfth aspect, the method of the tenth aspect or any other aspect, wherein the substrate is a grate or a fine mesh material.

According to an thirteenth aspect, the method of the twelfth aspect or any other aspect, wherein the fine mesh material is selected from the group consisting of felt, wool, micron-grade filter paper, and non-woven water-permeable fibrous material.

According to a fourteenth aspect, the method of the thirteenth aspect or any other aspect, wherein the solvent is water.

According to a fifteenth aspect, the method of the fourteenth aspect or any other aspect, wherein the insoluble fiber material is selected from the group consisting of virgin bleached cellulose fibers, virgin unbleached cellulose fibers, recycled unbleached cellulose fibers, hemp, synthetic fibers, nylon, biofibers, or mixtures of two or more thereof.

According to a sixteenth aspect, the method of the fifteenth aspect or any other aspect, wherein the weight ratio of calcium carbonate to magnesium carbonate is from about 1:5 to about 5:1.

According to a seventeenth aspect, the method of the fifteenth aspect or any other aspect, wherein the weight ratio of calcium carbonate to magnesium carbonate is from about 1:4 to about 2:3.

According to an eighteenth aspect, the method of the fifteenth aspect or any other aspect, wherein the mineral blend is integrally and homogenously formed with the substrate.

According to a nineteenth aspect, the method of the seventeenth aspect or any other aspect, wherein the mineral blend further includes calcium stearate, calcium fluoride, magnesium stearate, or mixtures of two or more thereof.

According to a twentieth aspect, a method for preparing an acid-reduced liquid beverage including: A) contacting a solid beverage material with an acid-reducing filter; B) contacting the solid beverage material and acid-reducing filter with a liquid to form a beverage matrix including the solid beverage material and the liquid; and C) separating the solid beverage material from the beverage matrix to obtain the acid-reduced liquid beverage, wherein the acid-reducing filter includes: 1) a mineral blend layer including calcium carbonate in an amount from about 25 wt % to about 40 wt % and magnesium carbonate in an amount from about 60 wt % to about 75 wt %; and 2) the liquid beverage has a change in pH of about 0.3 to 1.5 pH units higher than a liquid beverage prepared without the acid-reducing filter.

According to a twenty-first aspect, the method of the twentieth aspect or any other aspect, wherein the magnesium carbonate and calcium carbonate of the mineral blend are present in approximate amounts of 66 wt % and 33 wt %, respectively, and wherein the acid-reducing filter includes a filter permeability of about $2.7 \times 10^{-8}$ cm$^2$.

According to a twenty-second aspect, the method of the twentieth aspect or any other aspect, wherein the solid beverage material includes one or more of coffee beans, coffee grounds, or tea.

According to a twenty-third aspect, the method of the twentieth aspect or any other aspect, wherein the liquid is water.

According to a twenty-fourth aspect, the method of the twentieth aspect or any other aspect, wherein the liquid beverage is coffee or tea.

According to a twenty-fifth aspect, the method of the twentieth aspect or any other aspect, wherein the acid-reducing filter used includes a flow rate from about 5.0-10.0 milliliters per second.

According to a twenty-sixth aspect, a coffee filter including: A) an acid-reducing composition including: 1) calcium carbonate and magnesium carbonate with a weight ratio of calcium carbonate to magnesium carbonate of about 1:4 to about 2:3 by weight; and 2) one or more cellulose materials; B) a coffee filter body including a substrate of cellulose, wherein: 1) the acid-reducing composition is bound to the substrate of cellulose via the one or more cellulose materials; 2) the acid-reducing composition is free of soluble halide or hydroxide salts of alkali or alkaline earth metals; and 3) the acid-reducing composition and the coffee filter body are insoluble in water.

According to a twenty-seventh aspect, the coffee filter of the twenty-sixth aspect, wherein the magnesium carbonate and calcium carbonate of the acid-reducing composition are present in amounts ranging from about 60 wt % to about 75 wt %, and about 25 wt % to about 40 wt %, respectively, and wherein the coffee filter comprises a filter permeability of about $2.7 \times 10^{-8}$ cm$^2$.

According to a twenty-eighth aspect, the coffee filter of the twenty-sixth aspect or any other aspect, wherein the acid-reducing composition is integrally and homogenously formed with the substrate.

According to a twenty-ninth aspect, the coffee filter of the twenty-sixth aspect or any other aspect, wherein the acid-reducing composition is deposited as at least one mineral blend layer onto the coffee filter body.

According to a thirtieth aspect, the coffee filter of the twenty-seventh aspect or any other aspect, wherein the substrate is a grate or a fine mesh material.

According to a thirty-first aspect, the coffee filter of the thirtieth aspect or any other aspect, wherein the fine mesh material is selected from the group consisting of felt, wool, micron-grade filter paper, and non-woven water-permeable fibrous material.

According to a thirty-second aspect, the coffee filter of the thirty-first aspect or any other aspect, wherein the one or more cellulose materials include virgin bleached cellulose fibers, virgin unbleached cellulose fibers, recycled unbleached cellulose fibers, or combinations thereof.

According to a thirty-third aspect, the coffee filter of the thirty-second aspect or any other aspect, wherein the acid-reducing composition further includes calcium stearate, calcium fluoride, magnesium stearate, or mixtures of two or more thereof.

According to a thirty-fourth aspect, the coffee filter of the twenty-sixth aspect or any other aspect, wherein the coffee filter includes a flow rate of about 1.0-3.0 milliliters per second.

According to a thirty-fifth aspect, a method for preparing an acid-reduced beverage including: A) passing a pre-heated liquid through a beverage material to create a beverage liquid; and B) passing the beverage liquid through an acid-reducing material including a weight ratio of calcium carbonate to magnesium carbonate of about 1:4 to about 2:3 by weight thereby increasing the pH of the beverage liquid by about 0.3 to 1.5 pH units.

According to a thirty-sixth aspect, the method of the thirty-fifth aspect or any other aspect, wherein the beverage material is placed in a coffee filter material prior to passing the beverage liquid through the acid-reducing material.

According to a thirty-seventh aspect, the method of the thirty-fifth aspect or any other aspect, wherein the magnesium carbonate and calcium carbonate of the acid-reducing material are present in amounts ranging from about 60 wt % to about 75 wt %, and about 25 wt % to about 40 wt %, respectively, and wherein the coffee filter material comprises a filter permeability of about $2.7 \times 10^{-8}$ cm$^2$.

According to a thirty-eighth aspect, the method of the thirty-fifth aspect or any other aspect, wherein the acid-reducing material is formed with the coffee filter.

According to a thirty-ninth aspect, the method of the thirty-fifth aspect or any other aspect, wherein the beverage material is stored in a single-serve beverage pod.

DETAILED DESCRIPTION

Figure 1:
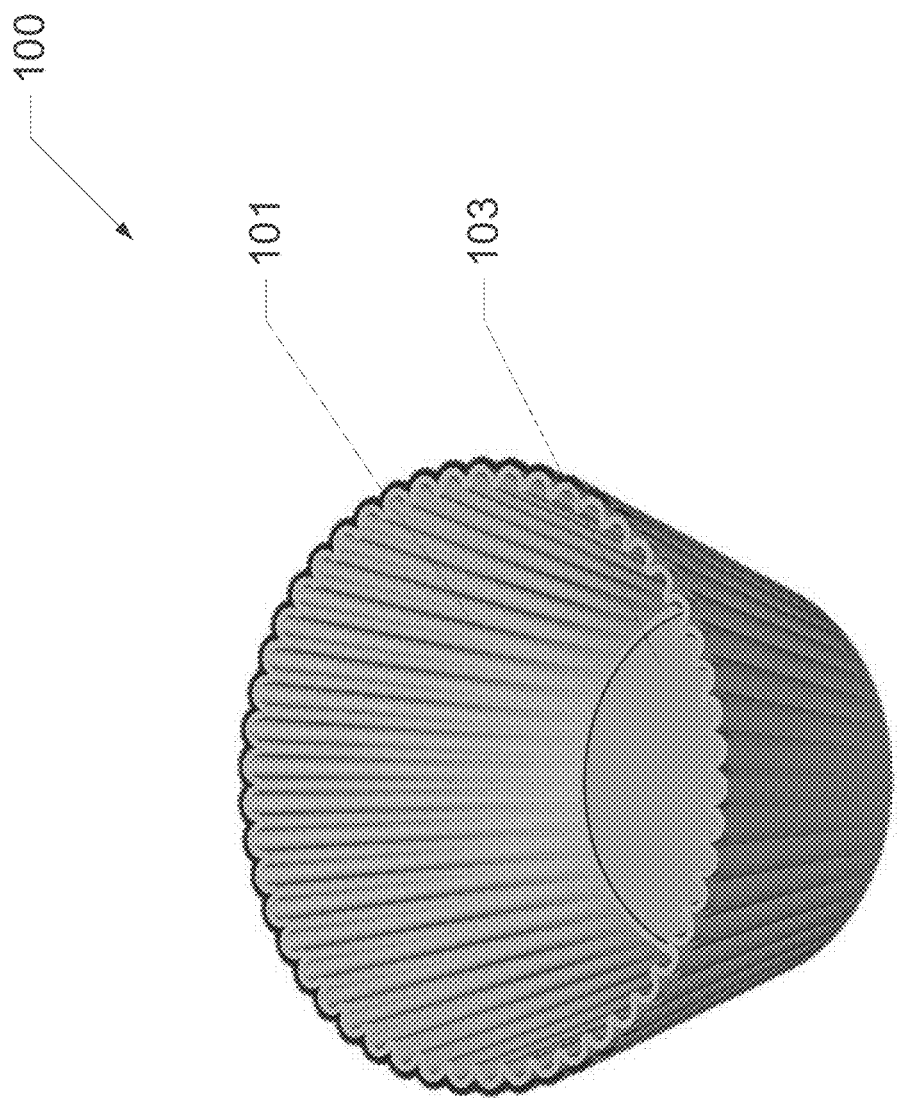
FIG. 1 illustrates an embodiment of an acid-reducing filter according to one embodiment.

Various embodiments are described hereafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). The description herein is not intended to give a definitive or limiting meaning of a particular term or aspect of the present systems, methods, or apparatuses disclosed in this document.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Overview

The present technology includes an apparatus. In one or more embodiments, the apparatus is an acid-reducing filter. In various embodiments, the acid-reducing filter is specifically a coffee filter, which includes one or more acid-reducing elements. The present technology includes one or more methods for preparing, producing, or manufacturing the acid-reducing filter and/or the coffee filter and methods of preparing an acid-reduced beverage using the acid-reducing filter and/or the coffee filter.

In one or more embodiments, the present technology relates to a process for preparing an acid-reduced beverage.

In one or more embodiments herein, a method of the present technology includes depositing a mineral blend layer that may include calcium carbonate and magnesium carbonate in a weight ratio of about 1:10 to about 10:1. For example, in at least one embodiment herein, the weight ratio of calcium carbonate to magnesium carbonate may be about 1:10 to 10:1, about 1:5 to about 5:1, about 1:4 to about 2:3, or any range including and/or in between any two of the preceding values. Suitable weight ratios include, but are not limited to, about 1:10, about 1:9, about 1:8, about 1:7, about 1:6, about 1:5, about 1:4, about 2:3, about 1:3, about 1:2, about 1:1, about 2:1, about 3:1, about 3:2, about 4:1, about 5:1, about 6:1, about 7:1, about 8:1, about 9:1, about 10:1, and any range including and/or in between any two of the preceding values.

In any embodiment herein, a method of the present technology may include depositing a coating layer that includes the insoluble fiber materials. For example, in any embodiment herein, the method may include depositing a coating layer to the filter substrate. In any embodiment herein, the method may include depositing a coating layer onto the mineral blend layer. The method, in any embodiment herein, may include depositing one or more coating layers. For example, the method may include depositing a first coating layer to the filter substrate, depositing the mineral blend layer on to the first coating layer, and depositing a second coating layer to the mineral blend layer, where the mineral blend layer is disposed between the first and the second coating layers.

In any embodiment herein, the acid-reducing filter obtained from the methods as described herein in any embodiment may include the mineral blend layer from about 1 wt % to about 25 wt %. For example, in any embodiment herein, the amount of the mineral blend layer in the acid-reducing filter may be about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, or any range including and/or in between any two of the preceding values.

In an aspect, the present technology provides a method for preparing the acid-reducing filter that includes combining a mineral blend and a solvent to obtain a material matrix; depositing a layer of the material matrix to a substrate; and separating the solvent from the material matrix; where the mineral blend includes calcium carbonate, magnesium carbonate, and insoluble fiber materials, the mineral blend has a weight ratio of calcium carbonate to magnesium carbonate of about 1:10 to about 10:1 by weight of the mineral blend, and the mineral blend is insoluble in water.

In any embodiment herein, the method includes combining a mineral blend as described herein in any embodiment with a solvent to obtain a material matrix. The material matrix, in any embodiment, may be a suspension, slurry or the like where the mineral blend is insoluble in the solvent. In any embodiment herein, the solvent may include, but are not limited to, protic solvents in which calcium carbonate, magnesium carbonate, and the insoluble fiber materials are insoluble. Suitable protic solvents may include, but are not limited to, alcohols, ammonia, a secondary amino compound, water, or a mixture of any two or more thereof. In any embodiment herein, the protic solvent may include water, such as deionized water.

While specific solvents have been disclosed, numerous other solvent that would be known to those having ordinary skill in the art having the present disclosure before them are likewise contemplated for use. In any embodiment herein, the solvent may include water.

In any embodiment herein, the method of the present technology includes depositing a mineral blend layer that may include calcium carbonate and magnesium carbonate in a weight ratio of about 1:10 to about 10:1. For example, in any embodiment herein, the weight ratio of calcium carbonate to magnesium carbonate may be about 1:10 to 10:1, about 1:5 to about 5:1, about 1:4 to about 2:3, or any range including and/or in between any two of the preceding values. The mineral blend may include calcium carbonate in an amounts as described herein in any embodiment; for example, the calcium carbonate may be present in an amount from about 25 wt % to about 40 wt %. The mineral blend may include magnesium carbonate in an amount as described herein in any embodiment, for example, from about 60 wt % to about 75 wt %.

In any embodiment herein, the mineral blend may include insoluble fiber materials including, but not limited to, virgin bleached cellulose fibers, virgin unbleached cellulose fibers, recycled unbleached cellulose fibers, hemp, synthetic fibers, biofibers (e.g., biopolymers, cotton, silk, or the like), or mixtures of two or more thereof.

In any embodiment herein, the mineral blend layer is insoluble. For example, in any embodiment herein, the mineral blend layer may not include materials that are soluble in water. In any embodiment herein, the mineral blend layer may not include soluble halide or hydroxide salts of alkali or alkaline earth metals. For example, in any embodiment herein, the mineral blend may not include water soluble halide or hydroxide salts of alkali or alkaline earth metals.

In any embodiment herein, the mineral blend may further include insoluble salts or additives as described herein in any embodiment. For example, in any embodiment herein, the mineral blend may include one or more insoluble salts including, but not limited to, calcium stearate, calcium fluoride, magnesium stearate, magnesium fluoride, or mixtures of two or more thereof. The insoluble salts may be included in the mineral blend in an amount from 0 wt % to about 15 wt %. In any embodiment herein, the mineral blend may include one or more additives including, but not limited to, retention aids, wet strength additives, or the like or combinations thereof. The one or more additives may be included in the mineral blend in an amount from 0 wt % to about 15 wt %.

In any embodiment herein, the method includes depositing the material matrix to a substrate. For example, in any embodiment herein, the substrate may include a grate, fine mesh material, or the like or combinations thereof. In any embodiment herein, the substrate may be a fine mesh material. For example, in any embodiment herein, the fine mesh material may include, but is not limited to, felt, wool, micron-grade filter paper, non-woven water-permeable fibrous material, or the like or combinations of two or more thereof. Suitable micron-grade filter papers include, but are not limited to, coffee filter paper.

In any embodiment herein, the method includes separating the solvent from the material matrix to obtain the acid-reducing filter. For example, the separating may include removing the solvent by gravity filtration, vacuum filtration, or the like or combinations thereof.

In any embodiment herein, the acid-reducing filter obtained from the method as described herein in any embodiment may include the mineral blend layer from about 1 wt % to about 25 wt %. For example, in any embodiment herein, the amount of the mineral blend layer in the acid-reducing filter may be about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, or any range including and/or in between any two of the preceding values.

The acid-reducing filters prepared according to the present technology exhibit flow properties suitable for conventional beverage brewing methods. In any embodiment herein, the acid-reducing filters prepared according to the methods described herein in any embodiment exhibit a flow rate of about 0.5 mL/s to about 5 mL/s. For example, in any embodiment, the acid-reducing filters exhibit a flow rate of about 0.5 mL/s, about 0.6 mL/s, about 0.7 mL/s, about 0.8 mL/s, about 0.9 mL/s, about 1 mL/s, about 1.2 mL/s, about 1.4 mL/s, about 1.6 mL/s, about 1.8 mL/s, about 2 mL/s, about 2.2 mL/s, about 2.4 mL/s, about 2.6 mL/s, about 2.8 mL/s, about 3 mL/s, about 3.2 mL/s, about 3.4 mL/s, about 3.6 mL/s, about 3.8 mL/s, about 4 mL/s, about 4.2 mL/s, about 4.4 mL/s, about 4.6 mL/s, about 4.8 mL/s, about 5 mL/s, or any range including and/or in between any two of the preceding values.

In any embodiment herein, the acid-reducing filters prepared according to the methods described herein in any embodiment exhibit a flow rate of about 5 mL/s to about 10 mL/s. For example, in any embodiment, the acid-reducing filters exhibit a flow rate of about 5 mL/s, about 5.5 mL/s, about 5.6 mL/s, about 5.7 mL/s, about 5.8 mL/s, about 5.9 mL/s, about 6 mL/s, about 6.2 mL/s, about 6.4 mL/s, about 6.6 mL/s, about 6.8 mL/s, about 7 mL/s, about 7.2 mL/s, about 7.4 mL/s, about 7.6 mL/s, about 7.8 mL/s, about 8 mL/s, about 8.2 mL/s, about 8.4 mL/s, about 8.6 mL/s, about 8.8 mL/s, about 9 mL/s, about 9.2 mL/s, about 9.4 mL/s, about 9.6 mL/s, about 9.8 mL/s, about 10.0 mL/s, or any range including and/or in between any two of the preceding values.

In any embodiment herein, the acid-reducing filters prepared according to the methods described herein in any embodiment exhibit a flow rate of about 10 mL/s to about 20 mL/s. For example, in any embodiment, the acid-reducing filters exhibit a flow rate of about 10 mL/s, about 10.5 mL/s, about 10.6 mL/s, about 10.7 mL/s, about 10.8 mL/s, about 10.9 mL/s, about 11 mL/s, about 11.2 mL/s, about 11.4 mL/s, about 11.6 mL/s, about 11.8 mL/s, about 12 mL/s, about 12.2 mL/s, about 12.4 mL/s, about 12.6 mL/s, about 12.8 mL/s, about 13 mL/s, about 13.2 mL/s, about 13.4 mL/s, about 13.6 mL/s, about 13.8 mL/s, about 14 mL/s, about 14.2 mL/s, about 14.4 mL/s, about 14.6 mL/s, about 14.8 mL/s, about 15 mL/s, about 15.2 mL/s, about 15.4 mL/s, about 15.6 mL/s, about 15.8 mL/s, about 16 mL/s, about 16.2 mL/s, about 16.4 mL/s, about 16.6 mL/s, about 16.8 mL/s, about 17 mL/s, about 17.2 mL/s, about 17.4 mL/s, about 17.6 mL/s, about 17.8 mL/s, about 18 mL/s, about 18.2 mL/s, about 18.4 mL/s, about 18.6 mL/s, about 18.8 mL/s, about 19 mL/s, about 19.2 mL/s, about 19.4 mL/s, about 19.6 mL/s, about 19.8 mL/s, about 20 mL/s or any range including and/or in between any two of the preceding values.

The acid-reducing filters prepared according to the present technology exhibit permeability properties suitable for conventional brewing methods. In various embodiments herein, an acid-reducing filter of the present technology may exhibit a filter permeability from about $1.7 \times 10^{-8}$ cm$^2$ to about $5.6 \times 10^{-7}$ cm$^2$. For example, in any embodiment herein, the magnitude of the filter permeability may be about $1.7 \times 10^{-8}$ cm$^2$, about $2.5 \times 10^{-8}$ cm$^2$, about $2.8 \times 10^{-8}$ cm$^2$, about $3.2 \times 10^{-8}$ cm$^2$, about $4.2 \times 10^{-8}$ cm$^2$, about $5.6 \times 10^{-7}$ cm$^2$, or any range including and/or in between any two of the preceding values. In at least one embodiment, an acid-reducing filter of the present technology may include a mineral blend (e.g., in a mineral blend layer and/or integrally formed into a substrate of the acid-reducing filter) including 60 wt % MgCO$_3$ and 40 wt % CaCO$_3$, wherein the acid-reducing filter exhibits a filter permeability of about $2.7 \times 10^{-8}$ cm$^2$. In some embodiments, the permeability of the previous sentence may be exhibited by one or more acid-reducing filters including a mineral blend, wherein the mineral blend includes calcium carbonate in an amount from about 25 wt % to about 40 wt % and magnesium carbonate in an amount from about 60 wt % to about 75 wt %.

It is believed that decreasing the acidity of liquid beverages, such as coffee or tea, improves the taste of the beverage. For example, additives like milk are often added to coffee or tea to increase the pH of the beverages. The acid-reducing filters prepared according to the present technology increase the pH of a liquid beverage. In any embodiment herein, the acid-reducing filters prepared according to the methods of the present technology may increase pH by about 0.3 to about 1.5 units higher than a liquid beverage prepared without the acid-reducing filter. For example, in any embodiment herein, the acid-reduced liquid beverage may have a change in pH of about 0.3 units, about 0.4 units, about 0.5 units, about 0.6 units, about 0.7 units, about 0.8 units, about 0.9 units, about 1 unit, about 1.1 units, about 1.2 units, about 1.3 units, about 1.4 units, about 1.5 units, or any range including and/or in between any two of the preceding values.

In an aspect, the preset technology includes an acid-reducing filter prepared according to any of the methods described herein in any embodiment. For example, in any embodiment herein, the acid-reducing filter includes a substrate, a mineral blend that includes calcium carbonate and magnesium carbonate, where the mineral blend layer is present in an amount from about 1 wt % to about 25 wt % of the acid-reducing filter, and the calcium carbonate and magnesium carbonate are present in a weight ratio of about 1:10 to 10:1 of the mineral blend layer.

In any embodiment herein, the acid-reducing filter includes a mineral blend layer that may include calcium carbonate and magnesium carbonate in a weight ratio of about 1:10 to about 10:1. For example, in any embodiment herein, the weight ratio of calcium carbonate to magnesium carbonate in the mineral blend layer may be about 1:10 to 10:1, about 1:5 to about 5:1, about 1:4 to about 2:3, or any range including and/or in between any two of the preceding values. The mineral blend may include calcium carbonate in an amount as described herein in any embodiment; for example, the calcium carbonate may be present in an amount from about 25 wt % to about 40 wt %. The mineral blend may include magnesium carbonate in an amount as described herein in any embodiment, for example, from about 60 wt % to about 75 wt %.

In any embodiment herein, the mineral blend may further include insoluble fiber materials including, but not limited to, virgin bleached cellulose fibers, virgin unbleached cellulose fibers, recycled unbleached cellulose fibers, hemp, synthetic fibers (such as Nylon), biofibers (e.g., biopolymers, cotton, silk, or the like), or mixtures of two or more thereof.

In any embodiment herein, the mineral blend layer is insoluble. For example, in any embodiment herein, the mineral blend layer does not include materials that are soluble in water. In any embodiment herein, the mineral blend layer does not include soluble halide or hydroxide salts of alkali or alkaline earth metals. For example, in any embodiment herein, the mineral blend does not include water soluble halide or hydroxide salts of alkali or alkaline earth metals.

In any embodiment herein, the mineral blend may further include insoluble salts or additives as described herein in any embodiment. For example, in any embodiment herein, the mineral blend may include one or more insoluble salts including, but not limited to, calcium stearate, calcium fluoride, magnesium stearate, magnesium fluoride, or mixtures of two or more thereof. The insoluble salts may be included in the mineral blend in an amount from 0 wt % to about 15 wt %. In any embodiment herein, the mineral blend may include one or more additives including, but not limited to, retention aids, wet strength additives, or the like or combinations thereof. The one or more additives may be included in the mineral blend in an amount from 0 wt % to about 15 wt %.

In any embodiment herein, the acid-reducing filter may include one or more coating layers that include an insoluble fiber material as described herein in any embodiment. For example, in any embodiment herein, the acid-reducing filter may include a coating layer on the filter substrate. In any embodiment herein, the acid-reducing filter may include a coating layer on the mineral blend layer. In any embodiment herein, the acid-reducing filter may include a first coating layer and a second coating layer, where the mineral blend layer is disposing between the first coating layer and the second coating layer.

In any embodiment herein, the acid-reducing filter may include the mineral blend layer from about 1 wt % to about 25 wt %. For example, in any embodiment herein, the amount of the mineral blend layer in the acid-reducing filter may be about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, or any range including and/or in between any two of the preceding values.

In a related aspect, the present technology includes a process for preparing an acid-reduced liquid beverage that includes: contacting a solid beverage material with an acid-reducing filter; contacting the solid beverage material and acid-reducing filter with a liquid to form a beverage matrix including the solid beverage material and liquid; and separating the solid beverage material from the beverage matrix to obtain the acid-reduced liquid beverage; where the acid-reducing filter is prepared according to any method described herein in any embodiment, and the liquid beverage has a change in pH of about 0.3 to about 1.5 pH units higher than a liquid beverage prepared without the acid-reducing filter.

In any embodiment herein, the solid beverage material may include, but is not limited to, coffee beans, coffee grounds, tea leaves, or the like. In any embodiment herein, the liquid is water.

In any embodiment herein, following separating the solid beverage material from the beverage matrix, the acid-reduced liquid beverage is obtained. In any embodiment herein, the acid-reduced liquid beverage has a pH of about 0.3 to about 1.5 units higher than a liquid beverage prepared without the acid-reducing filter. For example, in any embodiment herein, the acid-reduced liquid beverage may have a change in pH of about 0.3 units, about 0.4 units, about 0.5 units, about 0.6 units, about 0.7 units, about 0.8 units, about 0.9 units, about 1 unit, about 1.1 units, about 1.2 units, about 1.3 units, about 1.4 units, about 1.5 units, or any range including and/or in between any two of the preceding values.

The present invention, thus generally described, will be understood more readily by reference to the following figures, which are provided by way of illustration and are not intended to be limiting of the present invention.

In any embodiment described herein or otherwise, the acid-reducing filter may specifically be a coffee filter. In any such embodiment, the coffee filter may present one or more of any properties, elements, and appearances detailed in the description of the acid-reducing filter. Further, in any such embodiment, the coffee filter may be fabricated by one or more of any methods detailed in the description of the one or more methods for fabrication of the acid-reducing filter.

For the purposes of clarity, an acid-reducing filter discussed herein may be produced by one or more methods. In some embodiments, the one or more methods may include integrally combining a mineral blend (e.g., as described herein) and a filter substrate (e.g., as described herein) in a manner such that a homogenous mixture is formed. In at least one embodiment, an acid-reducing filter formed from the homogenous mixture may present the mineral blend as an integral, homogenously distributed structural component. In various embodiments, wherein the mineral blend is integrally and homogenously combined with the substrate, and the acid-reducing filter is formed from the homogenous mixture, the mineral blend may include one or more of the mineral blend layer properties (e.g., wt %, ratios, etc.) described herein.

In one or more other embodiments, the mineral blend may be added to an existing filter as at least one mineral blend layer deposited onto the existing filter.

As will be understood from the discussion above and herein, this disclosure contemplates at least stand-alone filters with an integrally formed mineral layer, a mineral blend layer that can be added to an existing filter, and a mineral blend layer that can be added to a single-serve beverage container.

DETAILED DESCRIPTIONS OF THE FIGURES

FIG. 1 illustrates an embodiment of an acid-reducing filter 100. As shown in the embodiment of FIG. 1, the acid reducing filter 100 includes a substrate 101. In FIG. 1, the substrate 101 is coffee filter paper; however, the acid-reducing filter 100 may be produced from a variety of substrate materials. Suitable substrate materials for the production of the acid-reducing filter 100 may include, but are not limited to: 1) micron-grade, non-woven water-permeable filter paper, such as coffee filter paper; 2) felt material, wherein the material is formed into a water-permeable grate and/or screen; 3) wool material, wherein the material is formed into a water-permeable grate and/or screen; 4) micron-grade filter paper; 5) one or more other fibrous materials, wherein the one or more other fibrous materials may be formed into a water-permeable grate and/or screen; and 6) cheese cloth, or the like. In various embodiments, the non-woven water-permeable filter paper may be coffee filter paper, tea bag, or the like.

In various embodiments, the substrate 101 forms a grate and/or mesh in which water may pass through. In one or more embodiments, the substrate 101 (grate and/or mesh) is capable of obstructing and/or otherwise preventing the passage of solid particles through the grate and/or mesh (e.g., particles of a minimum diameter). In at least one aspect, the substrate 101 includes a complex matrix of interwoven fibers that form a grate and/or mesh configuration, which may prevent the obstruction or prevention of solid particle passage.

In various embodiments, the substrate 101 is of a general shape capable of holding solid beverage material. In at least one embodiment, the shape of the substrate 101 may meet one or more criteria including, but not limited to: 1) a generally flat bottom; and 2) one or more side walls, wherein the interior angle between the walls and a top surface of the generally flat bottom is obtuse. In one or more embodiments, the general shape of the substrate 101 may be a solid of revolution.

As will be understood from discussions herein, in one or more embodiments, the acid reducing filter 100 may be filled with any suitable solid beverage material, including, but not limited to, coffee beans, coffee grounds, tea leaves, and/or other solid beverage materials.

In various embodiments, the acid reducing filter 100 includes a mineral blend layer 103. As will be understood from discussions herein, the mineral blend layer 103 may reduce the acidity of a beverage created with the acid-reducing filter 100. In one or more embodiments, the mineral blend layer 103 is deposited and/or oriented onto the substrate 101, by one or more methods described herein (or other methods). In one or more embodiments, the mineral blend layer 103 may be disposed on the top surface of the generally flat bottom of the substrate 101.

In various embodiments, the mineral blend layer 103 includes one or more mineral components at a weight ratio of about 1:10 to about 10:1. In one or more embodiments, the one or more mineral components may be calcium carbonate and magnesium carbonate respectively. In one or more embodiments, the weight ratio of calcium carbonate to magnesium carbonate may be about 1:10 to 10:1, about 1:5 to about 5:1, about 1:4 to about 2:3, or any range including and/or in between any two of the preceding values. Suitable weight ratios may include, but are not limited to, about 1:10, about 1:9, about 1:8, about 1:7, about 1:6, about 1:5, about 1:4, about 2:3, about 1:3, about 1:2, about 1:1, about 2:1, about 3:1, about 3:2, about 4:1, about 5:1, about 6:1, about 7:1, about 8:1, about 9:1, about 10:1, and any range including and/or in between any two of the preceding values.

In various embodiments, the mineral blend layer 103 may include calcium carbonate in an amount from about 25 wt % to about 40 wt %. In one or more embodiments, the amount of calcium carbonate in the mineral blend layer 103 may be about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, or any range including and/or in between any two of the preceding values.

In various embodiments, the mineral blend layer 103 may include magnesium carbonate in an amount from about 60 wt % to about 75 wt %. In one or more embodiments, the amount of magnesium carbonate in the mineral blend layer 103 may be about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, or any range including and/or in between any two of the preceding values.

In various embodiments, the mineral blend layer 103 may be insoluble in a suitable solvent, such as water. As used herein, the term "insoluble" refers to a property of one or more components (e.g., magnesium carbonate and calcium carbonate) that have little to no solubility in water or other suitable solvent as described herein. In one or more embodiments, the one or more components that may be insoluble in water may have a solubility that is less than about 1000 mg/L, about 900 mg/L, about 800 mg/L, about 700 mg/L, about 600 mg/L, about 500 mg/L, about 400 mg/L, about 300 mg/L, about 200 mg/L, about 100 mg/L, about 90 mg/L, about 80 mg/L, about 70 mg/L, about 60 mg/L, about 50 mg/L, about 40 mg/L, about 30 mg/L, about 20 mg/L, about 10 mg/L, about 5 mg/L, 0 mg/L (or any range including and/or in between any two of the preceding values) at a temperature of 25° C. In one or more embodiments, the mineral blend 103 may be absent of any and all soluble halide and/or or hydroxide salts of alkali and/or alkaline earth metals.

In various embodiments, the mineral blend 103 may include one or more additional insoluble (or soluble) materials. In one or more embodiments, the mineral blend 103 may further include insoluble fiber materials. In at least one embodiment, the insoluble fiber materials may include, but are not limited to: 1) virgin bleached cellulose fibers; 2) virgin unbleached cellulose fibers; 3) recycled unbleached cellulose fibers; 4) hemp; 5) synthetic fibers; 6) nylon; 7) biofibers (e.g., biopolymers, cotton, silk, or the like); and 8) mixtures of two or more insoluble fiber materials.

In various embodiments, the one or more additional insoluble materials may include one or more insoluble salts. In one or more embodiments, the one or more insoluble salts may include, but are not limited to: 1) calcium stearate; 2) calcium fluoride; 3) magnesium stearate; 4) magnesium fluoride; 5) other insoluble salts; and 6) mixtures of two or more thereof and/or other insoluble salts not listed. The one or more insoluble salts may be included in the mineral blend 103 in an amount from 0 wt % to about 15 wt %. In at least one embodiment, the amount of insoluble salts included in the mineral blend layer 103 may be about 0.01 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, about 15 wt %, or any range including and/or in between any two of the preceding values.

In one or more embodiments, the suitable solvent may refer to, but is not limited to, one or more protic solvents, wherein calcium carbonate, magnesium carbonate, and an insoluble fiber materials are insoluble in the one or more protic solvents. The one or more protic solvents may include, but are not limited to; 1) alcohols; 2) ammonia; 3) a secondary amino compound; 4) water; and 5) a mixture of any two or more thereof. In any embodiment herein, the protic solvent may include water, such as deionized water. While specific solvents have been disclosed, numerous other solvents are contemplated for use with the systems and methods herein.

In any embodiment herein, the mineral blend layer 103 may include one or more additives. In various embodiments, the one or more additives may include, but are not limited to: 1) retention aids; 2) wet strength additives; and 3) combinations of two or more thereof and/or other additives not listed. In one or more embodiments, the one or more additives may include, but are not limited to: 1) Polyamidoamine-Epichlorohydrin Resin; 2) Polyamine-Epichlorohydrin Resins; 3) Cationic Gloxylated Resins; 4) Urea-Formaldehyde; 5) Melamine-Formaldehyde; 7) Alkylketene Dimers (AKD); 8) Alkenylsuccinic Anhydride (ASA); and 9) any combination of the above and/or other additives not listed. In at least one embodiment, the one or more additives may be included in the mineral blend layer 103 in an amount from 0 wt % to about 15 wt %. In various embodiments, the amount of the one or more additives in the mineral blend may be about 0.01 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, about 15 wt %, or any range including and/or in between any two of the preceding values.

Figure 2A:
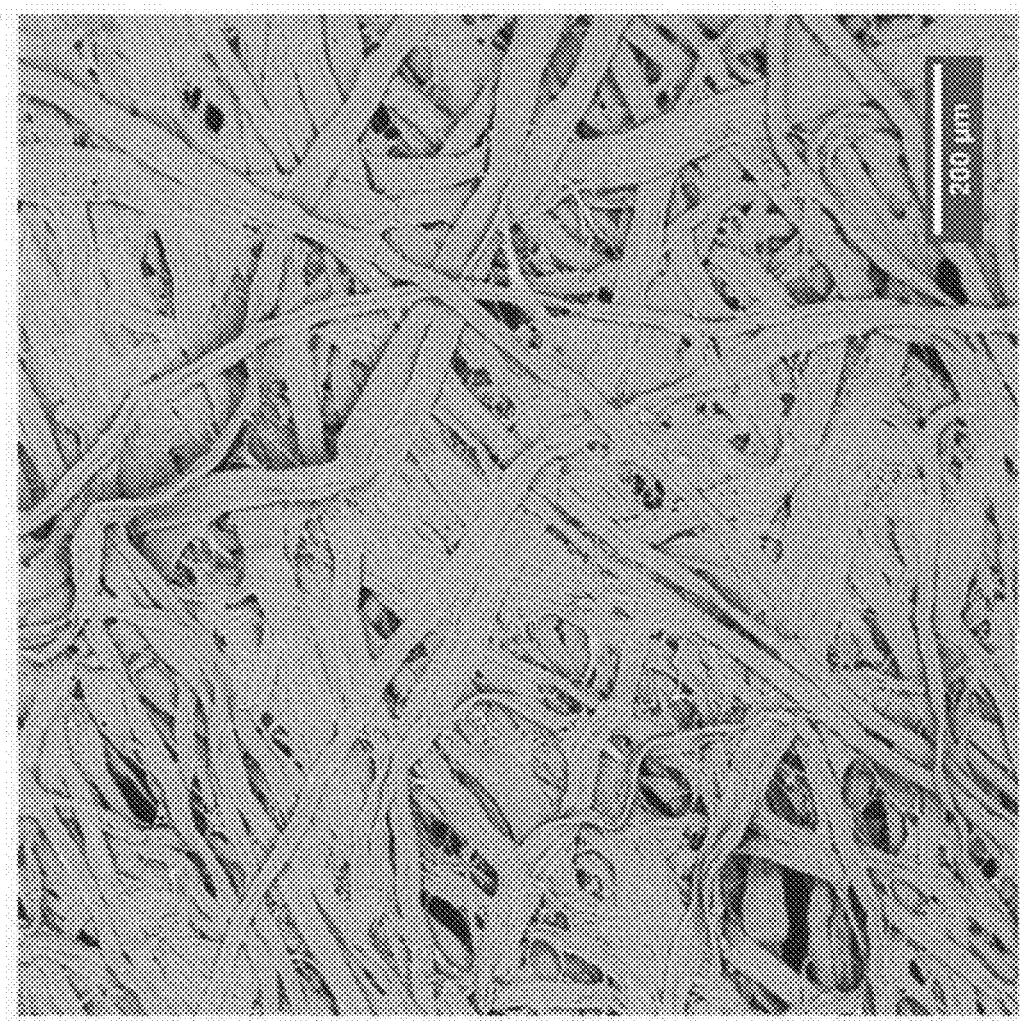
FIGS. 2A-B illustrate a 200 μm magnified image of a regular cellulose coffee filter (FIG. 2A) and a 200 μm magnified image of an exemplary acid-reducing coffee filter (FIG. 2B) according to the one embodiment.

FIG. 2A illustrates an exemplary scanning electron microscopy (SEM) image 200A of an unmodified cellulose filter (e.g., a paper filter) taken at 200 µm magnification. In an SEM image, acid-reducing particles, such as those described herein, generally present as one or more white specks attached to one or more fibers. It is noted that the image 200A includes none of the one or more white specks; therefore, the image 200A infers that unmodified cellulose filters do not present an acid-reducing effect.

Figure 2B:
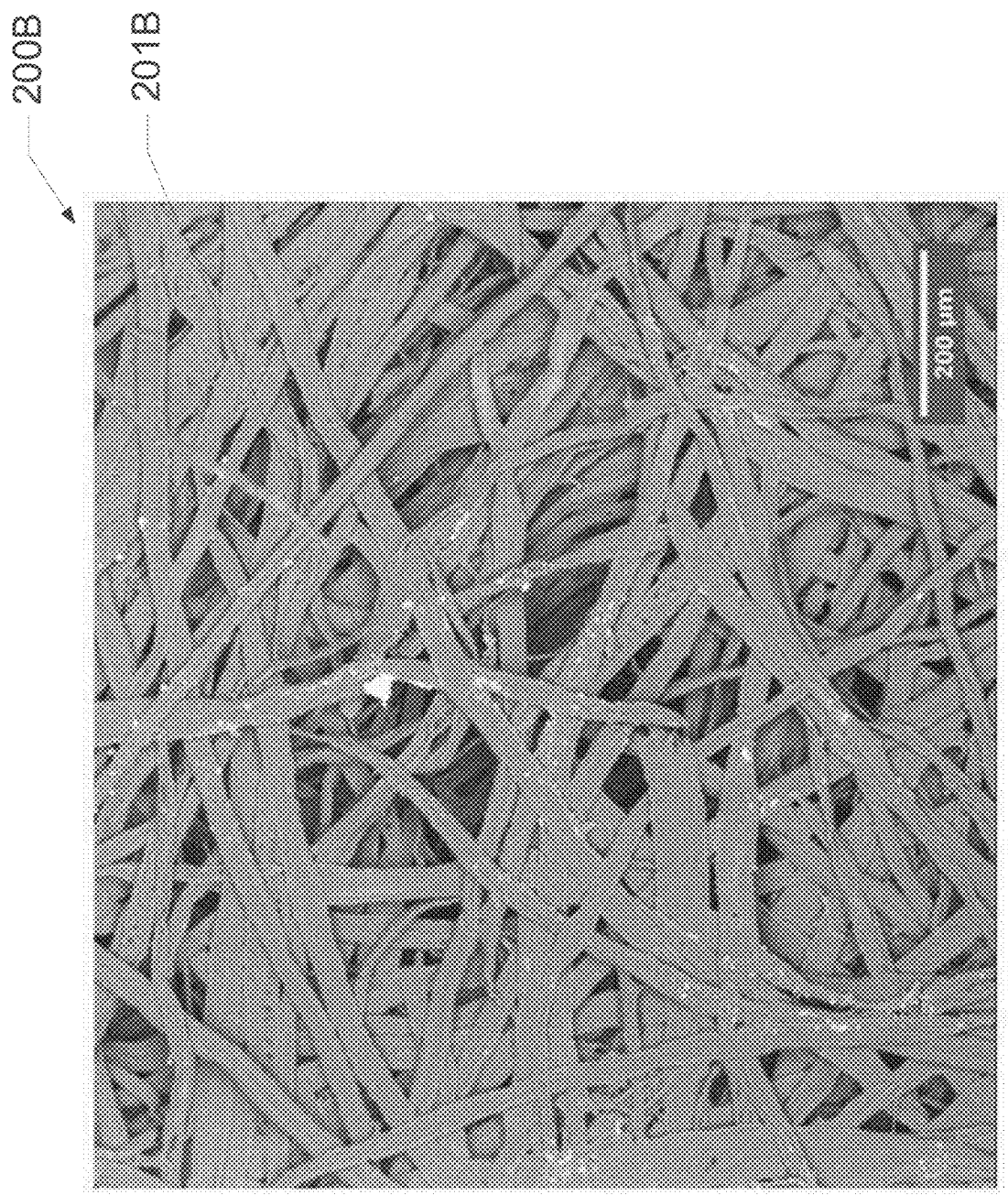

FIG. 2B illustrates an exemplary SEM image 200B of an acid-reducing filter, such as the acid-reducing filter 100 of FIG. 1, taken at 200 µm magnification. As shown in FIG. 2B, the acid reducing filter 200B includes one or more white specks 201B attached to one or more fibers. Thus, and in various embodiments, the one or more white specks 201B are acid-reducing particles, such as those described herein. In one or more embodiments, the one or more white specks 201B indicate a mineral blend layer, such as the mineral layer 103 of FIG. 1. In one or more embodiments, the one or more white specks 201B may include calcium carbonate, magnesium carbonate, and/or other acid-reducing mineral components in any proportion described herein.

In various embodiments, acid-reducing particles of the mineral blend layer (shown as one more white specks 201B in FIG. 2B) present a particle size in the range of 2-100 µm. In one or more embodiments, the mineral blend layer includes calcium carbonate particles of about 2-10 µm. In one or more embodiments the mineral blend layer includes magnesium carbonate particles of about 35-100 µm in size (e.g., 30 µm, 35 µm, 40 µm, 45 µm, 50 µm, 55 µm, 60 µm, 65 µm, 70 µm, 75 µm, etc.).

Figure 3:
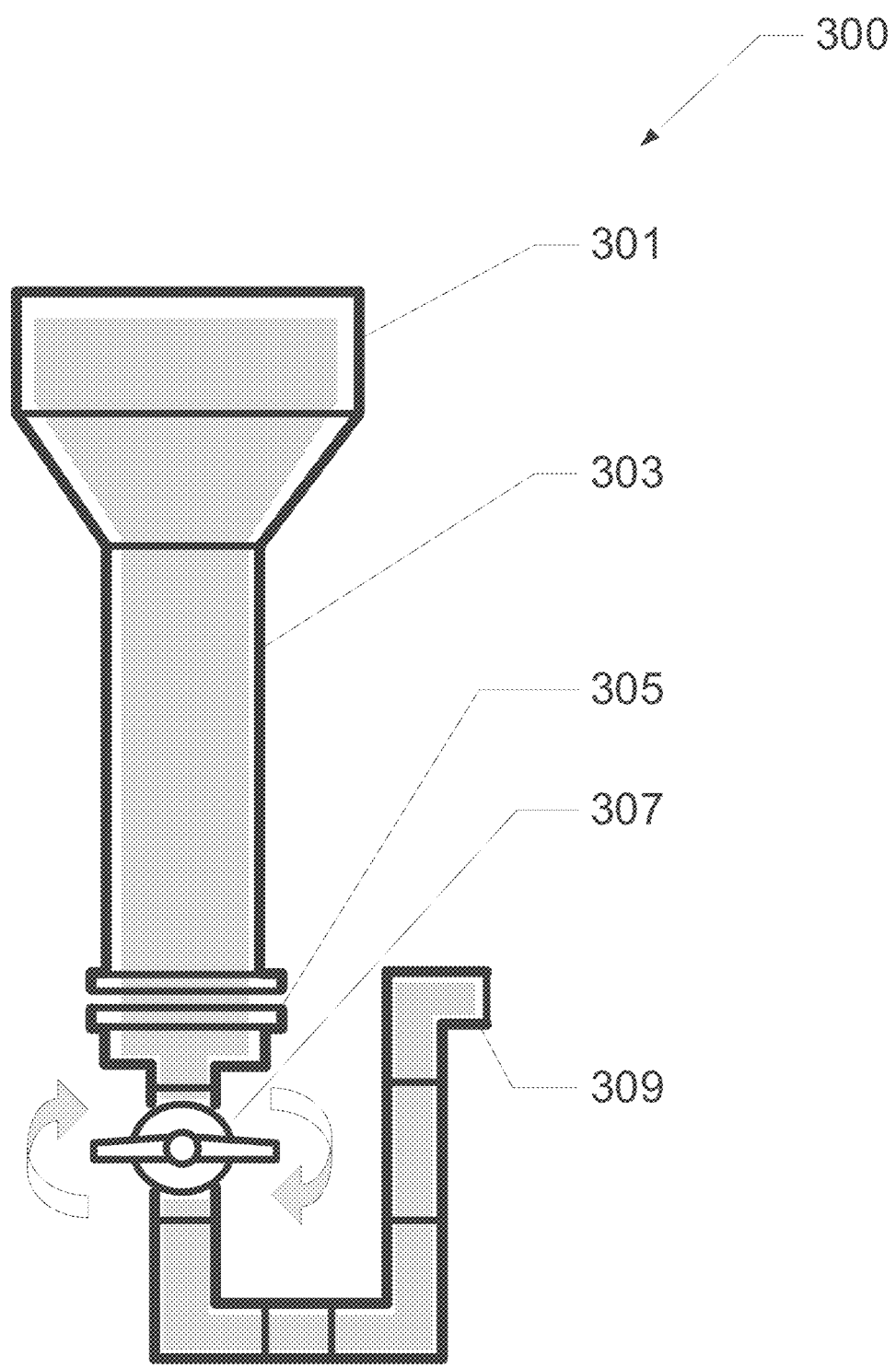
FIG. 3 illustrates a flow rate apparatus for evaluating flow rate of an exemplary acid-reducing filter according to one embodiment.

FIG. 3 shows an exemplary apparatus 300 which may characterize one or more properties, parameters, and/or relations pertaining to one or more filters. In various embodiments, the one or more filters characterized by a method, such as one or more of the testing methods further described herein, may include, but are not limited to: 1) unmodified filters of any and/or all compositions; 2) acid-reducing filters of any and/or all compositions described herein and/or otherwise; and 3) any and/or all acid-reducing filters fabricated by any and/or all methods described herein and/or otherwise. In various embodiments, the apparatus 300 may be constructed according to ASTM D5084-16a (FIG. 1).

In various embodiments, the apparatus 300 includes an intake section 301. In one or more embodiments, a general shape of the intake section 301 may include a solid of revolution, wherein the solid of revolution is open at both ends and the diameter at the top of the solid of revolution is greater than the diameter at the bottom of the solid of revolution. In at least one embodiment, the apparatus 300 further includes a column 303. In one or more embodiments, the column 303 includes a cylinder shape open at both ends, wherein one end is operatively connected to the bottom end of the intake section 301.

In various embodiments, the apparatus 300 further includes a flange 305. One of ordinary skill in the art will recognize that a flange generally refers to a disc, collar or ring attached to a column, such as the column 303. In various embodiments, the flange 305 enables attachment of one or more items, such as the filter 100 of FIG. 1, in an interior section of the flange 305. In one or more embodiments, the flange 305 is open at both ends and is operatively connected to the bottom end of the column 303 (e.g., the end of the column 303 which is not operatively connected to the intake section 301). In one or more embodiments, a filter, such as the acid reducing filter 100 of FIG. 1, may be inserted into an interior section of the flange 305 in a manner such that a surface of the filter inserted is oriented orthogonal to the column 303.

In various embodiments, the apparatus 300 further includes a flow control section 307. In one or more embodiments, the flow control section includes a length of piping and a stopcock. One of ordinary skill in the art will recognize stopcock generally refers to an externally operated valve regulating the flow of a liquid or gas through a pipe. In one or more embodiments, the flow control section 307 is open at both ends, wherein one end is operatively connected to the flange 305. In one or more embodiments, the end of the flow control section 307 not operatively connected to the flange 305 may constitute an output 309. In at least one embodiment, the apparatus 300 and all portions included therein may be sequentially and operatively connected in a manner such that a fluid may flow into the apparatus 300 via the intake section 301, flow through the column 303, flow through the flange 305, flow through the flow control section 307, wherein the stopcock is oriented in a manner such that it does not obstruct flow of the fluid, and flow out of the apparatus 300 via the output 309. In various embodiments, the apparatus 300 enables controlled flow of the liquid, including the rate of flow, via the stopcock of the flow section 307.

Figure 4A:
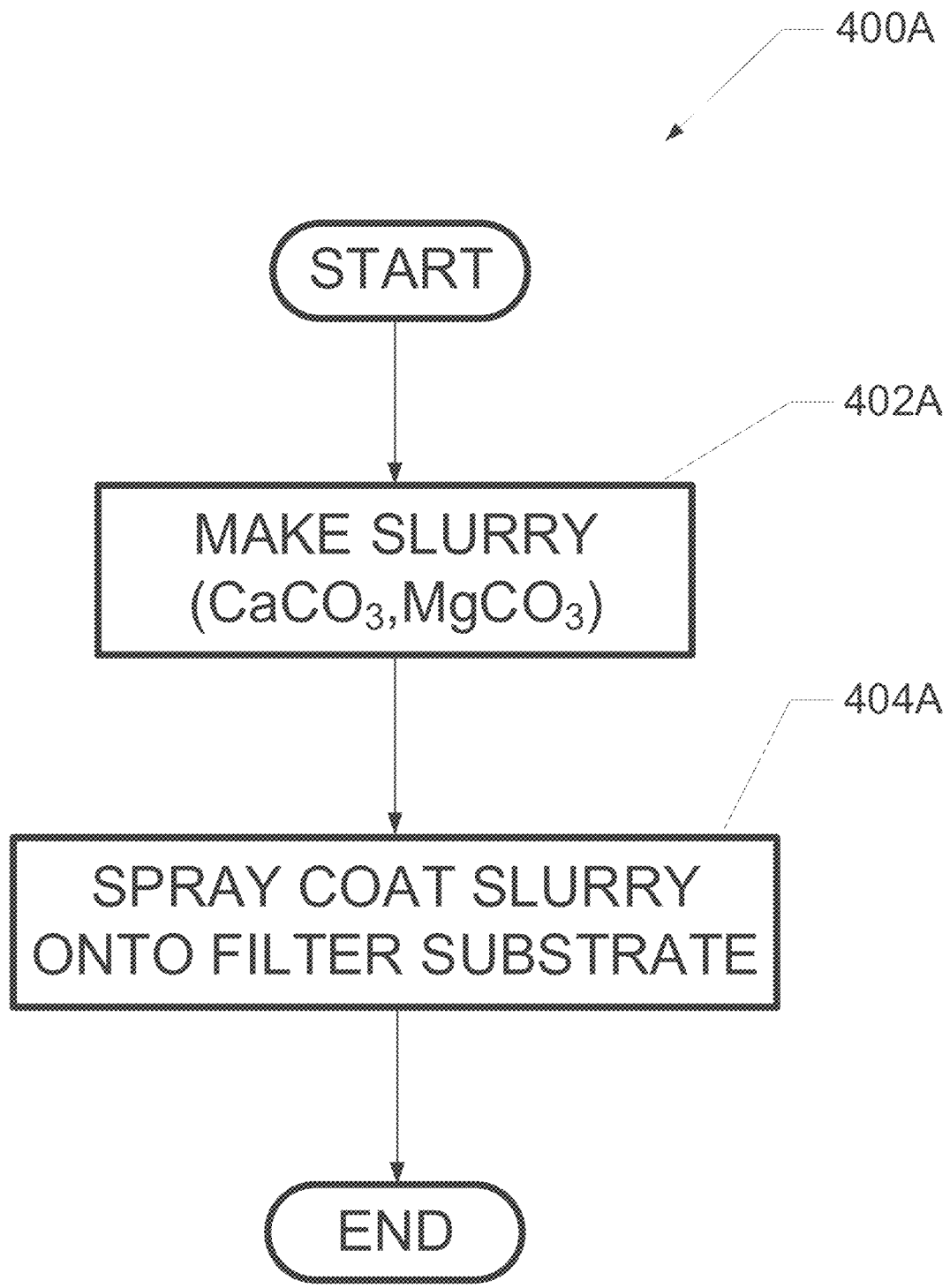
FIGS. 4A-4C illustrate flowcharts showing one or more exemplary methods for producing an acid-reducing filter according to one embodiment.

FIG. 4 illustrates flowcharts showing one or more exemplary methods for production of an acid-reducing filter according to one embodiment. FIG. 4A illustrates a first exemplary method, "spray coat deposition" 400A for production of an acid-reducing filter, such as the acid-reducing filter 100 of FIG. 1. In at least one embodiment, a user performs one or more steps. In one or more embodiments, the user may be a person, a machine, and/or a combination. In various embodiments, at step 402A, the user makes a slurry. In at least one embodiment, the slurry includes one or more mineral components, including the one or more mineral components described previously (such as in FIG. 1). In one or more embodiments, the slurry may include calcium carbonate and magnesium carbonate. In various embodiments, the slurry made in step 402A includes the calcium carbonate and magnesium carbonate components in one or more weight ratios and/or mixes described previously herein. In at least one embodiments, the user at step 402A makes a slurry through the combination of the one or more mineral components and water.

In at least one embodiment, the slurry of step 402A may include about 33% calcium carbonate ($CaCO_3$) and about 67% magnesium carbonate ($MgCO_3$). In one embodiment, the slurry of step 402A may contain about 1 g of the mineral components in water. In one or more embodiments, a ratio of mineral components and water may be calibrated to enable greater or weaker acid-reducing effects in the acid-reducing filter. In one or more embodiments, a greater ratio of mineral components to water may enable a greater acid-reducing effect in the acid-reducing filter.

In various embodiments, at 404A the user spray coats the slurry of step 402A onto a filter substrate, such as the filter substrate 101 of FIG. 1, thus forming a mineral blend layer. In one or more embodiments, spray coating of step 404A may continue until a point of sufficient saturation of the filter substrate is reached. In at least one embodiment, the acid-reducing filter is formed upon reaching the point of sufficient saturation. In at least one embodiment, the point of sufficient saturation may occur when the mineral blend layer includes a thickness of about 180 µm. In various embodiments, the user awaits drying of the spray coated and newly formed mineral blend layer, such as the mineral blend layer 103 of FIG. 1, before collecting the resulting acid-reducing filter.

Figure 4B:
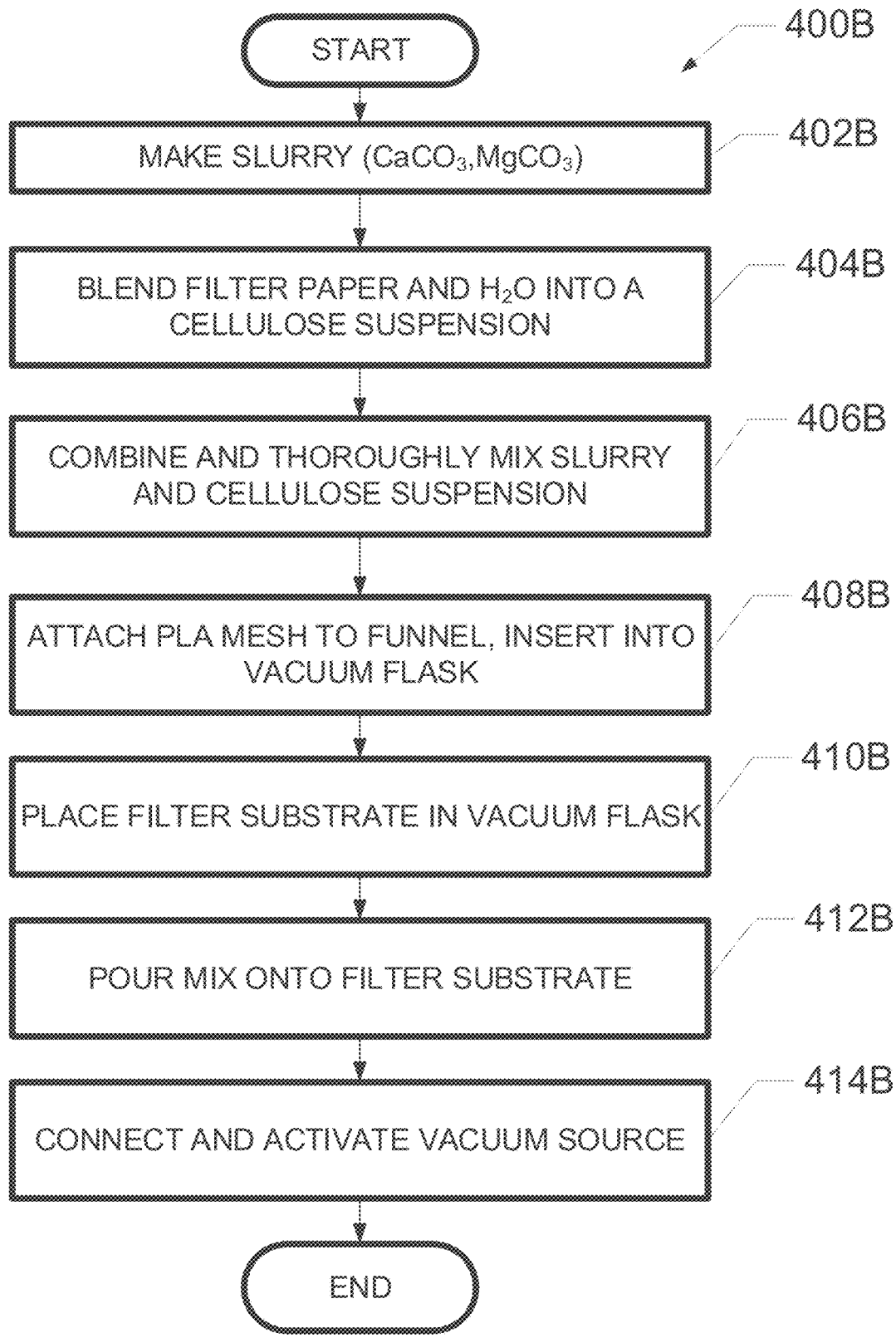

FIG. 4B illustrates a second exemplary method, "vacuum deposition" 400B for producing an acid-reducing filter according to one embodiment. In various embodiments, at step 402B, the user makes a slurry as described previously herein. In one or more embodiments, at step 404B the user blends filter paper and water into a cellulose suspension. One of ordinary skill in the art may recognize that filter paper generally includes cellulose material, and may further recognize that blending, as described herein, includes, but is not limited to: 1) combination of filter paper and a measure of suitable solvent in a blending machine (e.g., a blender); 2) agitation and disintegration of filter paper by the blending machine, wherein single filter paper is essentially reduced to its component cellulose fibers; and 3) suspension of the resulting cellulose fibers in the measure of suitable solvent. In at least one embodiment, the measure of suitable solvent may be 175 ml per single unit of filter paper utilized. In various embodiments, the suitable solvent may be the one or more suitable solvents described previously herein. In at least one embodiment, step 404B may occur prior and/or simultaneously to step 402B.

In various embodiments, at step 406B the user combines and mixes the slurry of step 402B and the cellulose suspension of 404B, thus forming a slurry-cellulose mixture. In one or more embodiments, the slurry and the cellulose suspension may be combined at a volumetric ratio of about 1:10 to about 10:1. In various embodiments, the volumetric ratio of slurry to cellulose suspension may be about 1:10 to 10:1, about 1:5 to about 5:1, about 1:4 to about 2:3, or any range including and/or in between any two of the preceding values. Suitable volumetric ratios may include, but are not limited to, about 1:10, about 1:9, about 1:8, about 1:7, about 1:6, about 1:5, about 1:4, about 2:3, about 1:3, about 1:2, about 1:1, about 2:1, about 3:1, about 3:2, about 4:1, about 5:1, about 6:1, about 7:1, about 8:1, about 9:1, about 10:1, and any range including and/or in between any two of the preceding values.

In various embodiments, at step 408B, the user attaches a polylactic acid (PLA) mesh screen to a funnel, forming a funnel-mesh combination, and inserts the funnel-mesh combination into a vacuum flask. In at least one embodiment, the PLA mesh screen may be attached to the funnel via adhesives, such as silicone. One of ordinary skill in the art will recognize a funnel generally includes a solid of revolution, wherein the solid of revolution is open at both ends and the diameter at the top of the solid of revolution is greater than the diameter at the bottom of the solid of revolution. In one or more embodiments, dimensions of the PLA mesh screen may be calibrated in a manner such that PLA mesh screen generally sheathes the interior surface of the funnel. In at least one aspect, the interior surface of the funnel referred to herein includes the section of the overall funnel interior surface between the section of the funnel presenting the largest diameter, proceeded by a tapering diameter, (e.g., the intake of the funnel) and the start of the section presenting the smallest diameter (e.g., the output of the funnel).

In various embodiments, the vacuum flask into which the funnel-mesh combination is inserted is selected according to one or more physical criteria. In one or more embodiments, the one or more physical criteria may include a diameter of the flask opening that is greater than the diameter of the bottom of the funnel-mesh combination, but is less than the diameter of the top of the funnel-mesh combination.

One of ordinary skill in the art will recognize that vacuum flask may include a thick-walled Erlenmeyer flask with a short glass tube and hose barb protruding some distance from the neck of the flask. One of ordinary skill in the art will further recognize that the short tube and hose barb effectively act as an adapter over which the end of a thick-walled flexible hose (tubing) can be fitted to form a connection to the flask. One of ordinary skill in the art will even further recognize the other end of the hose can be connected to a source of vacuum such as an aspirator, vacuum pump, or house vacuum for the purposes of forming a negative pressure within the inner volume of the vacuum flask upon activation of the source of vacuum.

In various embodiments, at step 410B the user places a filter substrate, such as the filter substrate 101 of FIG. 1 described herein, into the funnel-mesh combination of 408B, which had been inserted into the vacuum flask in step 408B. In one or more embodiments, the filter substrate may include criteria similar to the criteria of the general shape described previously in FIG. 1. In at least one embodiment, the shape of the filter substrate placed in 410B may be a solid of revolution which generally conforms to the shape of the funnel-mesh combination in a manner such that the filter substrate generally sheathes the interior surface of the funnel-mesh combination. In at least one aspect, the interior surface of the funnel-mesh combination referred to herein includes the same corresponding sections referred to in the above description of the interior surface of the funnel. In at least one embodiment, step 408B and step 410B may happen, in order, before and/or simultaneously to steps 402B-406B.

In various embodiments, at step 412B the user pours the slurry-cellulose mixture of step 406B onto the filter substrate of step 410B. In one or more embodiments, the slurry-cellulose mixture may be poured in such a manner that a mineral blend layer, such as the mineral blend layer 103 of FIG. 1 described herein, is formed on top of the bottom surface of the filter substrate (e.g., the generally flat surface of the filter substrate which is not in contact with the PLA mesh screen).

In various embodiments, at step 414B a user connects a vacuum source (e.g., an aspirator, pump, etc.) to the vacuum flask of steps 408B, 410B, and 412B (e.g., via a properly dimensioned hose) and, following connection, activates the vacuum source. In one or more embodiments, the vacuum source produces a negative pressure in the interior volume of the vacuum flask. In at least one embodiment, the negative pressure in the interior volume causes aspiration of one or more liquid components of the slurry-cellulose mixture through the filter substrate and the PLA mesh screen, and into the interior volume of the vacuum flask. In one or more embodiments, the vacuum source may remain activated until the entirety of the one or more liquid components are aspirated out of the slurry-cellulose mixture.

In at least one aspect, the aspiration of the one or more liquid components of the slurry-cellulose mixture results in a solid mineral blend layer, such as the mineral blend layer 103 described in FIG. 1, dispersed onto the surface of the filter substrate. In various embodiments, the solid mineral blend layer includes cellulose fibers and the one or more mineral components, thus yielding an acid-reducing filter. In at least one embodiment, the user awaits drying of the newly formed mineral blend layer before collecting the resulting acid-reducing filter.

Figure 4C:
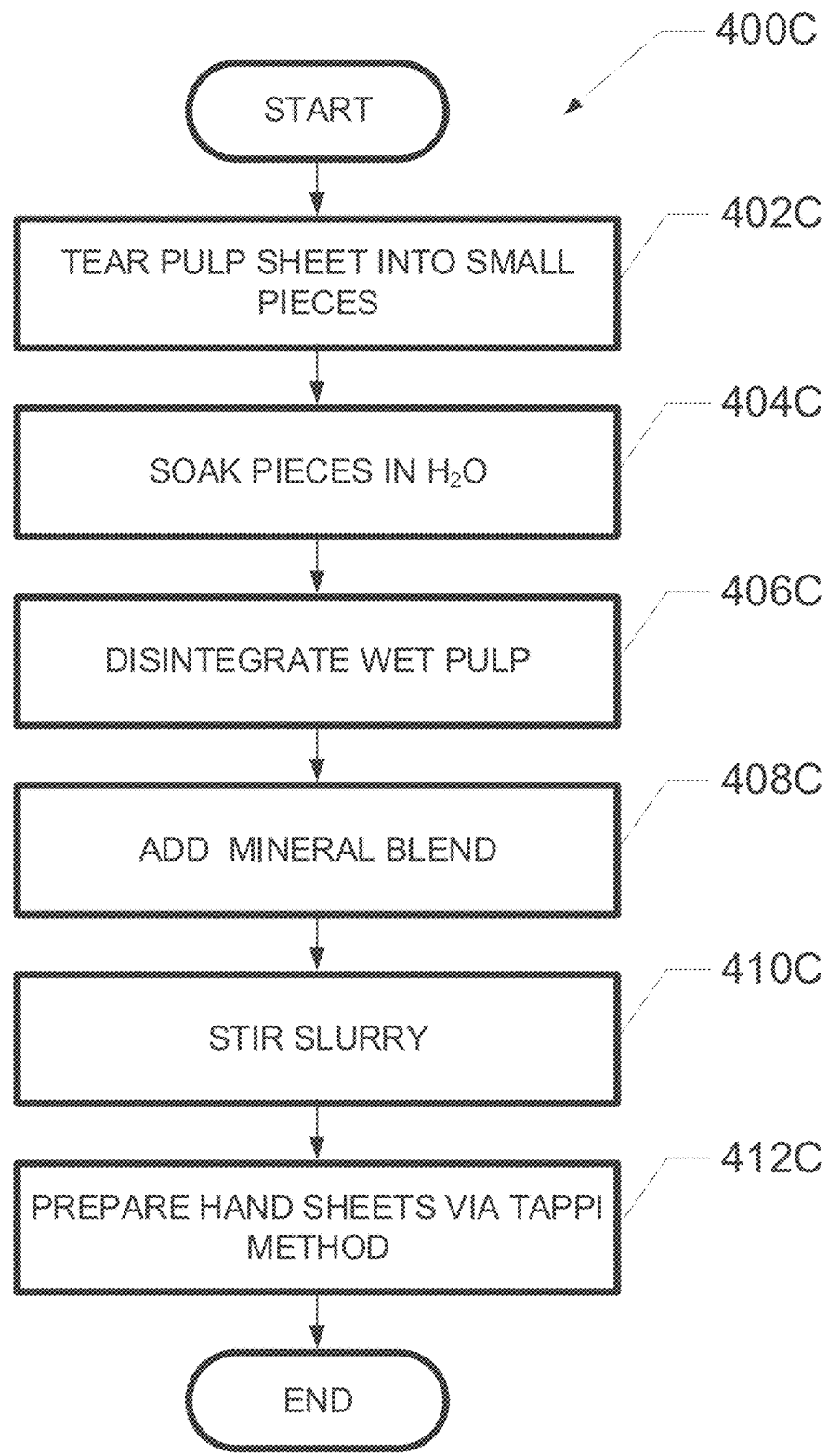

FIG. 4C illustrates a third exemplary method "hand sheet preparation" 400C for production of an acid-reducing filter, such as the acid-reducing filter 100 of FIG. 1, according to the present technology. In various embodiments, at step 402C the user tears one or more sheets of pulp into small pieces. In one or more embodiments, the pulp sheet includes southern pine fully bleached kraft pulp (e.g., virgin cellulose fiber). In at least one embodiment, the user tears the one or more sheets of pulp via manual and/or automatic processes.

In various embodiments, at step 404C the user soaks the small pieces in water for a duration of soaking time and thus obtains wet pulp, wherein the wet pulp contains cellulose fibers. In at least one embodiment, the duration of soaking time may be 4 hours. In one or more embodiments, at step 406C the user disintegrates the wet pulp in a British disintegrator for a duration of disintegrating time and thus obtains cellulose fiber slurry. One of ordinary skill in the art will recognize British disintegrators paddle, but do not shred one or more materials placed inside the British disintegrator. In one or more embodiments, the duration of disintegrating time may be 5 minutes.

In various embodiments, at step 408C the user adds one or more mineral components, such as the one or more mineral components and corresponding proportions previously described herein, to the cellulose fiber slurry obtained in the step 406C and thus obtains a cellulose-mineral slurry. In at least one embodiment, the one or more mineral components, of step 408C, include calcium carbonate and/or magnesium carbonate. In one or more embodiments, at step 410C the user stirs the cellulose-mineral slurry for a duration of stirring time. In one or more embodiments, the duration of stirring time may be 5 minutes.

In various embodiments, at step 412C the user prepares one or more hand sheets via the Tappi standard procedure T205 om-88 from the cellulose-mineral slurry of step 410C. In one or more embodiments, the user may obtain one or more aliquots of the cellulose-mineral slurry, wherein the one or more aliquots are of a specific mass. In one or more embodiments, the specific mass may be 1.2 grams. In one or more embodiments, the user may implement a Tappi standard hand sheet mold. In various embodiments, the user may evaluate, such as via ashing, retention of the one or more mineral components in the one or more hand sheets produced via step 412C. In one or more embodiments, a retention value may be expressed as a percentage and exemplary retention values may be captured in Table 2 below, wherein one or more weight portions corresponding with the one or more mineral components may be captured in Table 1 below. In various embodiments, one hand sheet for each dosage level of the mineral blend may be taken to determine ash content in duplicate.

TABLE 1

Mineral dosage levels.

| Mineral | Sample | | | |
| --- | --- | --- | --- | --- |
| | 1 | 2 | 3 | 4 |
| $MgCO_3$, wt %* | 13.75 | 27.5 | 41.67 | 83.33 |
| $CaCO_3$, wt %* | 7.08 | 12.5 | 20.83 | 41.67 |

*based on fiber mass: 60 g/m² of fiber (Samples 1, 2, and 3), or 1.2 g of cellulose fiber per filter

TABLE 2

Ash and mineral retention of the hand sheets.

| Sample | Ash content, % | Retention, %* |
| --- | --- | --- |
| 1 | 4.1 | 22.4 |
| 2 | 8.4 | 24.8 |
| 3 | 11.7 | 24.8 |
| 4 | 21.2 | 27.5 |

*Calculated as: ash weight/total mineral added * 100

Figure 5:
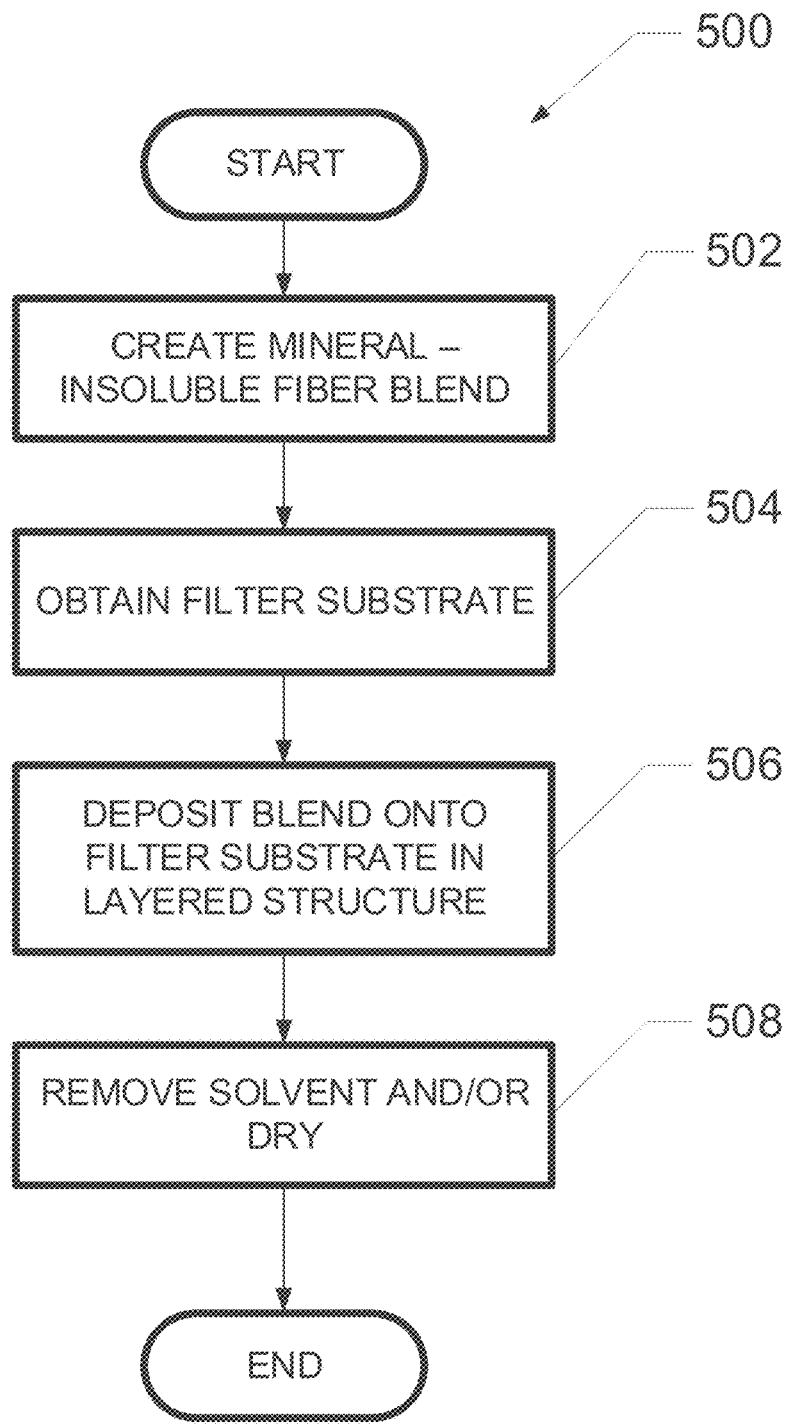
FIG. 5 illustrates a flowchart showing a method for producing an acid-reducing filter according to one embodiment.

FIG. 5 illustrates a flowchart 500 depicting an exemplary method for fabrication of an acid-reduced filter, according to the present technology. In at least one embodiment, a user performs one or more steps. In one or more embodiments, the user may be a person, a machine, and/or a combination. At step 502 the user creates a mineral-insoluble fiber blend via one or more of the methods described previously herein (e.g., one or more of the methods of FIG. 4 and other methods described elsewhere herein). In various embodiments, the mineral-insoluble fiber blend may include one or more mineral components and one or more insoluble materials, each of the one or more respective components and materials being similar to those described previously herein. At step 504 the user obtains a filter substrate. In one or more embodiments, the filter substrate may be selected from the one or more filter substrates described previously herein. In at least one embodiment, step 504 may occur before step 502 and/or simultaneously to step 502. At step 506 the user deposits the mineral-insoluble fiber blend of step 502 onto the filter substrate of step 504. In at least one embodiment, the user deposits the insoluble fiber blend onto the filter substrate in a manner such that a layered structure is formed. In one or more embodiments, the user may deposit the mineral-insoluble blend onto the filter substrate via one or more of the related methods previously described herein. In various embodiments, a product of step 506 may be an acid-reducing filter, wherein the solvent of the mineral-insoluble blend is still present. At step 508 the user removes (e.g., via aspiration) the solvent from the acid reducing filter and/or dries the acid-reducing filter. In at least one embodiment, a product of step 508 is an acid-reducing filter according to the present technology.

Figure 6:
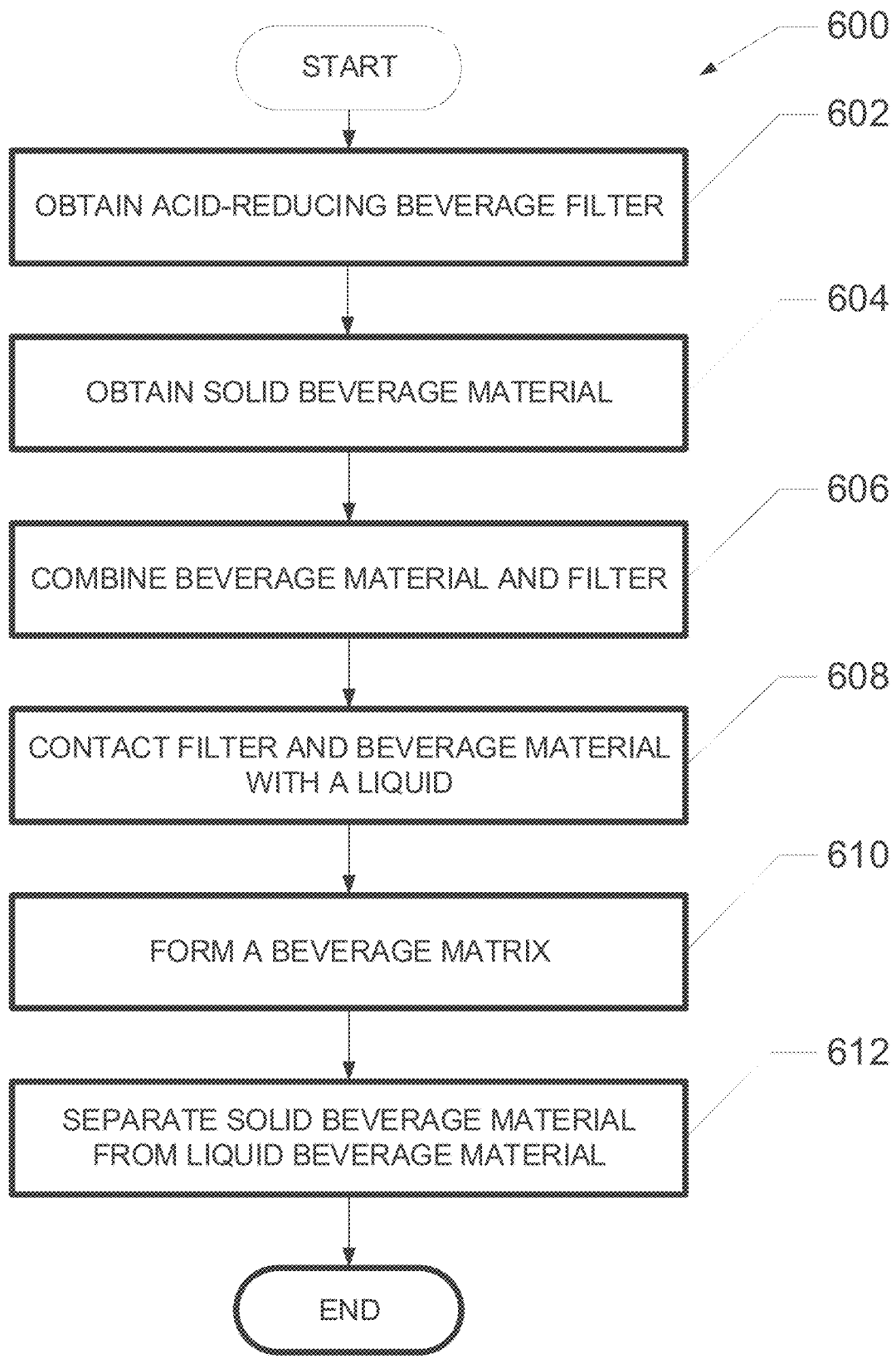
FIG. 6 illustrates a flowchart showing a method for producing an acid-reduced beverage according to one embodiment.

FIG. 6 illustrates a flowchart 600 depicting an exemplary method for producing an acid-reduced beverage, according to the present technology. In at least one embodiment, a user performs one or more steps. In one or more embodiments, the user may be a person, a machine, and/or a combination. At 602 the user obtains an acid-reducing filter according to the present technology. In various embodiments, the acid reducing filter may be obtained via fabrication. In one or more embodiments, fabrication of the acid-reducing filter may be conducted according to one or methods described previously herein. At step 604 the user obtains a solid beverage material. In at least one embodiment, the solid beverage material may include, but is not limited to, coffee beans, coffee grounds, tea leaves, or the like. In various embodiments, step 604 may occur before step 602 and/or simultaneously to step 602.

At step 606 the user combines the beverage material and the acid-reducing filter. In one or more embodiments, the combination of step 606 may occur in a coffee brewing machine (e.g., a drip coffee brewer, etc.). In one or more embodiments, the combination of step 606 may occur in a single use cup (e.g., a single use beverage pod).

At step 608 the user contacts the filter and beverage material with a liquid. In various embodiments, the liquid may be water. In one or more embodiments, the liquid may be-preheated. At step 610 the user forms a beverage matrix. In at least one embodiment, the user forms the beverage matrix via the coffee brewing machine of step 606 and/or a disparate coffee brewing machine. In one or more embodiments, the beverage matrix may include the solid beverage material of step 604 and a liquid beverage material, wherein the liquid beverage material was created as a product of the step 608.

At step 612, the user separates the solid beverage material from the liquid beverage material. In various embodiments, the user separates the solid and liquid beverage materials via an acid-reducing filter of the present technology, wherein the acid-reducing filter is fabricated via one or more of the methods of the present technology. In one or more embodiments, a product the step 612 is an acid-reduced beverage according to the present technology, and described previously herein.

Figure 7A:
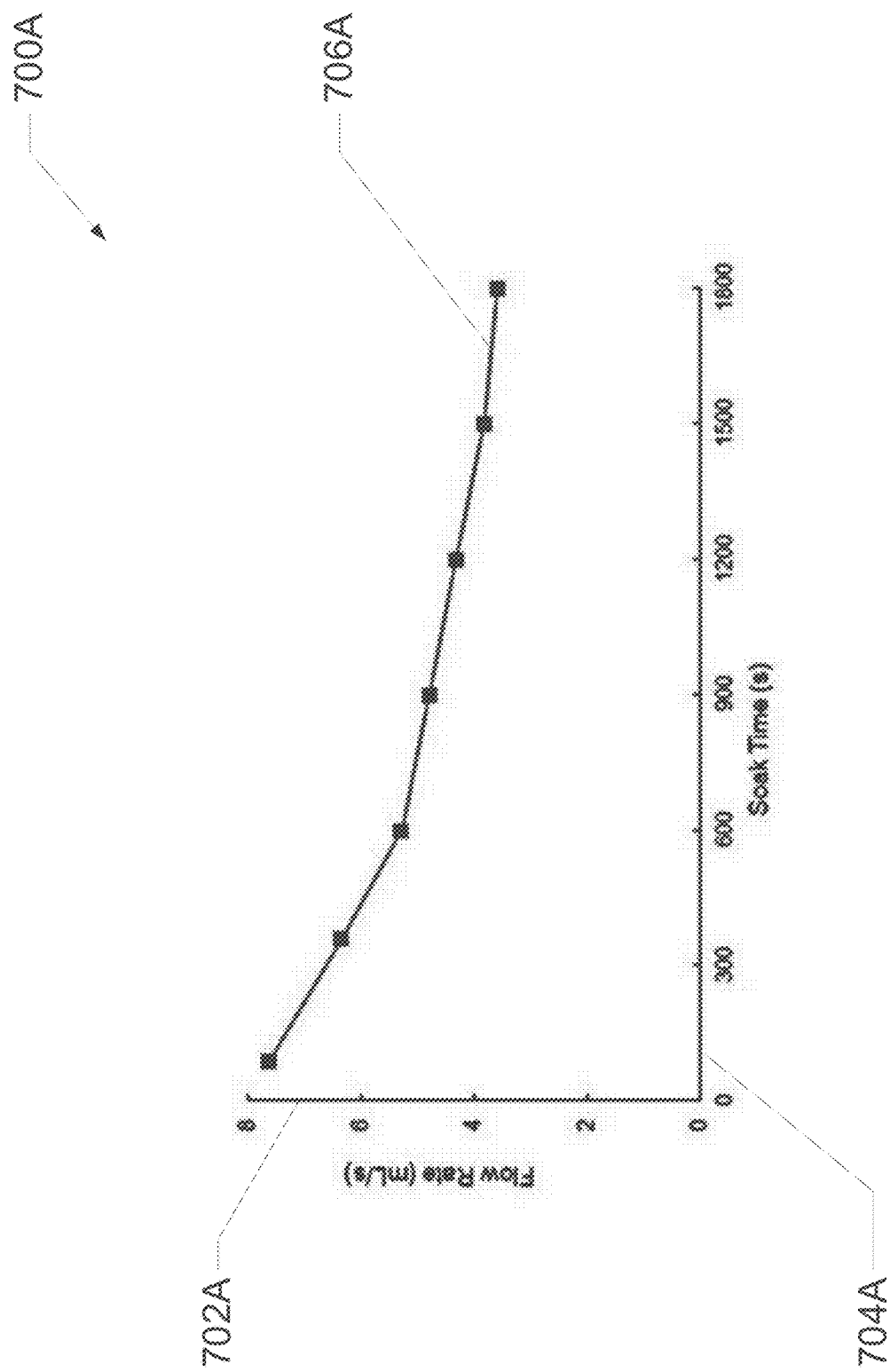
FIGS. 7A-7C illustrate three waveforms depicting relationships between flow rate of liquid through an unmodified paper filter, an acid-reducing filter according to one embodiment and one or more variables.
Figure 7B:
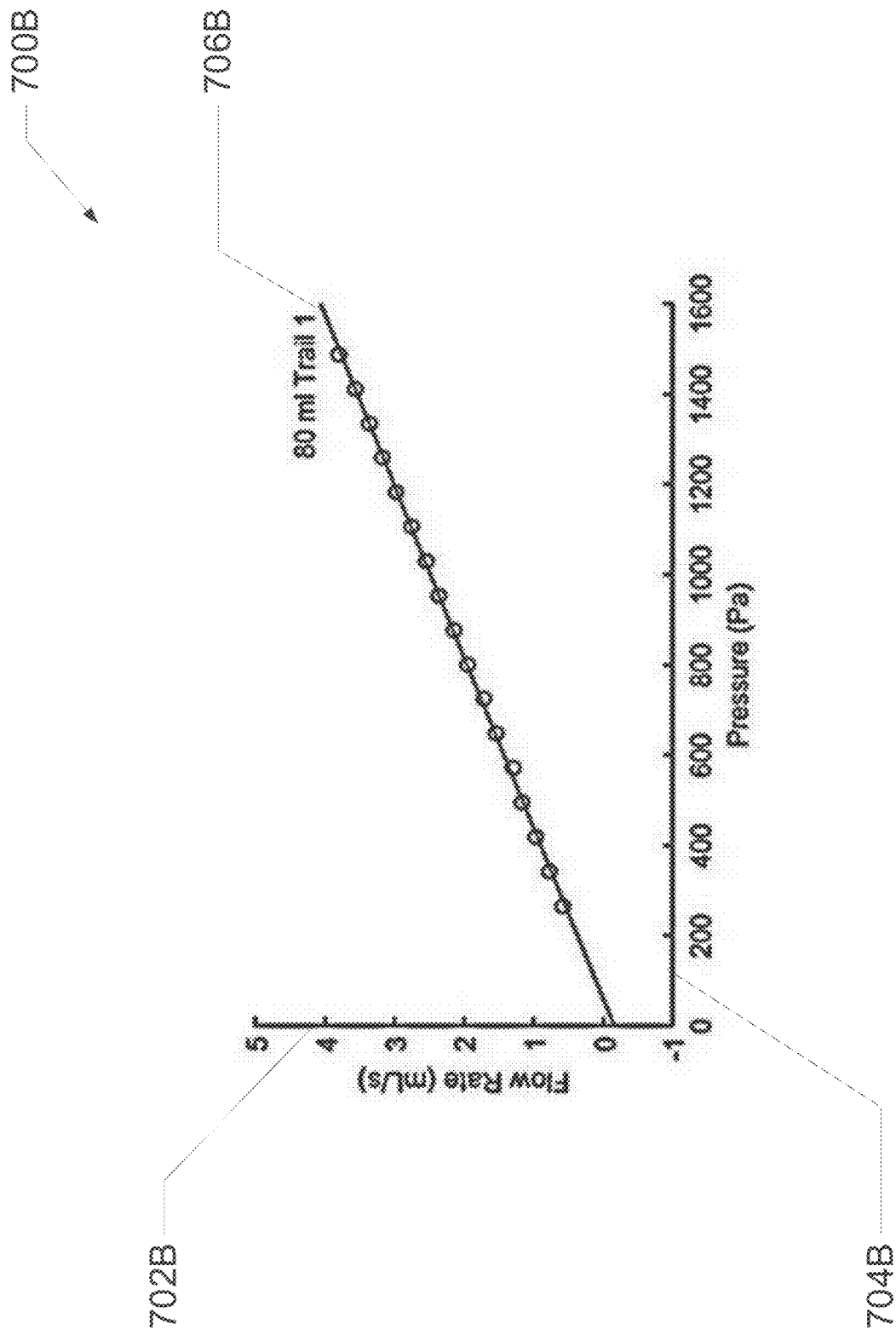
Figure 7C:
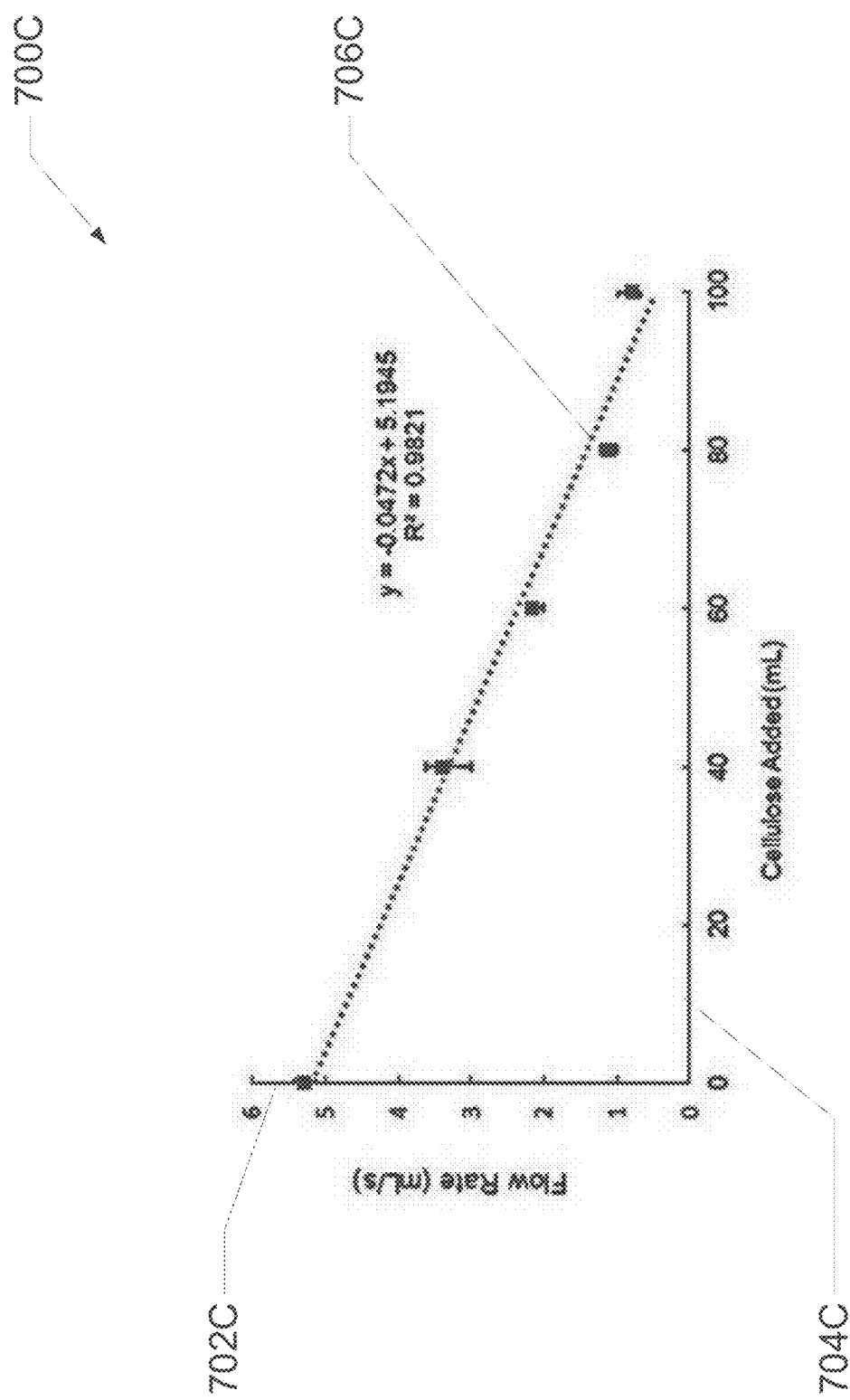

FIG. 7 illustrates three waveforms depicting relationships between flow rate of liquid through, in FIG. 7A and FIG. 7B, an unmodified paper filter and, in FIG. 7C, an acid-reducing filter according to the present technology, and one or more variables. In various embodiments, characterization of flow rate through the acid-reducing filter, which may be produced from the unmodified paper filter in one or more embodiments, is contributive to consistent production and performance of the acid-reducing filter, and the like. One of ordinary skill in the art will recognize one or more cellulose and/or other fibrous components of the unmodified paper filter and the acid-reducing filter may absorb liquid (e.g., water) at a sufficient proportion such that flow properties through the filter may be significantly changed. An inconsistent flow rate through the acid-reducing filter may contribute to increased unpredictability of time required to produce the one or more acid-reduced beverages. One of ordinary skill in the art will recognize the one or more acid-reduced beverages, such as coffee, are generally expected to present a production time of 300-600 seconds per 1000 ml serving (e.g., about 4 cups) of the one or more acid-reduced beverages. One of ordinary skill in the art will further recognize a flow rate through the acid-reducing filter may be dependent upon a pressure of a fluid flowing through the acid-reducing filter and an area of the acid-reducing filter through which the fluid flows. In at least one embodiment, both the area of the acid-reducing filter and the pressure of the fluid are directly proportional to flow rate.

FIG. 7A illustrates a waveform 700A and relates the flow rate (e.g., in mL/s) of liquid water 702A through an unmodified paper filter to a duration of soaking time 704A (e.g., time in seconds) of the respective unmodified paper filter. One of ordinary skill in the art will recognize soaking generally refers to embodiment and saturation of the unmodified paper filter by the liquid water. In various embodiments, a technique for producing experimental data required to produce the waveform 700A may be the constant head method. In one or more embodiments, an apparatus, such as the apparatus 300 of FIG. 3 described herein, performs the technique, such as the constant head method.

In various embodiments, the constant head method, as related to relating flow rate 702A and duration of soaking time 704A, includes several steps. Steps of the constant head method may include, but are not limited to: 1) loading the testing apparatus with an unmodified paper filter; 2) adding a 3D printed grate to the flange of the apparatus such that the filter is supported against sagging and/or stretching from pressures experienced during the test; 3) loading the testing apparatus piping with liquid water; 4) opening the stopcock of the apparatus, allowing the liquid water to flow through the filter; 5) adding liquid water to the apparatus in a manner such that the amount of liquid water in the apparatus is constant; 6) collecting the outflow of the apparatus in a graduated cylinder; and 7) for every 50 mL of outflow, recording the duration of time passed since the opening of the stopcock, for the first 50 mL, and between every 50 mL of outflow. One of ordinary skill in the art will recognize that the flow rate for every 50 mL of outflow may be computed by dividing the volume of outflow by the duration of time between each respective 50 mL of outflow.

A trend 706A of the waveform 700A demonstrates an inverse relationship between flow rate 702A and the duration of soaking time 704A. The trend 706A further demonstrates inconsistency in the flow rate 702A through the unmodified paper filter unless the duration of soaking time 704A is about and/or greater than 600 seconds. One of ordinary skill in the art will recognize a 600 second soaking time may be appropriate for production of the one or more acid-reduced beverages, noting the previously stated production times generally known in the art.

FIG. 7B illustrates a waveform 700B and relates the flow rate (e.g., in mL/s) of liquid water 702B through an unmodified paper filter to a magnitude of pressure 704B (e.g., in Pascals) applied to the respective unmodified paper filter. One of ordinary skill in the art will recognize pressure applied to the respective unmodified paper filter generally refers to the pressure applied to a surface thereof through which liquid water flows. In various embodiments, a technique for producing experimental data required to produce the waveform 700B may be a falling head method. In one or more embodiments, an apparatus, such as the apparatus 300 of FIG. 3 described herein, performs the technique, such as the falling head method.

In various embodiments, the falling head method, as related to flow rate 702B and magnitude of pressure 704B, may include several steps. Steps of the falling head method may include, but are not limited to: 1) loading the testing apparatus with an unmodified paper filter; 2) adding a 3D printed grate to the bottom flange of the apparatus such that the unmodified paper filter is supported against sagging and/or stretching from pressures experienced during the test; 3) adding water to the apparatus in a manner such that a 16 cm column of water forms above the unmodified paper filter; 3) opening the stopcock of the apparatus, allowing the liquid water to flow through the filter, out of the apparatus and into a 500 mL graduated cylinder; and 4) recording time stamps, via slow motion video capture, at 5 mL filling increments of the graduated cylinder.

One of ordinary skill in the art will recognize that the magnitude of pressure 704B applied to the unmodified paper filter may be described by Equation 1, and thus computed from the recorded time stamps, volumetric data and other data obtained in and relating to the above method.

$$\Delta P = \rho g h(t) = \rho g \frac{V(t)}{A} \qquad \text{(Equation 1)}$$

Wherein, $\Delta P$ may be pressure, $V(t)$ may be the volume of the water column at a given time, A may be the area of the surface of the unmodified paper filter through which the water column flows, g may be acceleration due to gravity, and $\rho$ may be the density of liquid water.

One of ordinary skill in the art will further recognize that the flow rate 702B through the unmodified paper filter in the above described falling head method may be computed in similar manner to that of the above described constant head method, using the recorded time stamps, volumetric data, other data, and other parameters obtained in and/or computed from the above falling head method.

A trend 706B of the waveform 700B demonstrates a direct and laminar relationship between flow rate 702B through and the magnitude of pressure 704B applied to the unmodified paper filter. One of ordinary skill in the art will recognize the direct and laminar relationship is appropriate for production of the one or more acid-reduced beverages, wherein direct and laminar flow rate-pressure relations may further enable production consistency.

FIG. 7C illustrates a waveform 700C and relates the flow rate (e.g., in mL/s) of liquid water 702C through an acid-reducing filter, as described herein, to the volume of cellulose 704C (e.g., in mL) added to a filter substrate in fabrication, as described herein, of the respective acid-reducing filter. In various embodiments, the relation between the flow rate 702C and the volume of cellulose 704C may be determined via the above described constant head method and apparatus, wherein the amount of cellulose added to an acid-reducing filter tested is iteratively varied. In one or more embodiments, the characterization of the flow rate-cellulose relation enables understanding permeability of the acid-reducing filter. In at least one aspect, understanding of the permeability of the acid-reducing filter may be strongly desired because the permeability may significantly contribute to performance, cost, and other elements of the acid-reducing filter.

One of ordinary skill in the art will recognize that the flow rate through the acid-reducing filter may be computed in similar manner to that of the above described constant head method (e.g., using the recorded time stamps, volumetric data, other data, and other parameters obtained in the constant head method). In various embodiments, the flow rate-cellulose relation may be described through graphical visualization, as has been done in FIG. 7C.

One of ordinary skill in the art will further recognize the permeability of the acid-reducing filter may be calculated, via methods previously described herein and rearrangement of Equation 2, from parameters relating to and data obtained from the above described apparatus and falling head method, wherein cellulose added is iteratively varied.

$$Q = -\frac{kA\Delta P}{\mu L} \quad \text{(Equation 2)}$$

Wherein, the flow rate may be given by Q (e.g., determined by methods previously described herein), $\Delta P$ may be a pressure change (e.g., determined by the difference between respective pressures at disparate time points), A may be an area of flow (e.g., area of the filter through which the liquid water flows, $\mu$ is viscosity of water, and L may be a length over which the pressure change is occurring, or a thickness of the acid reducing filter. The permeability of the acid-reducing filter may be given by k, where k is independent of pressure and area. In at least one embodiment, performance of the acid-reducing filter may be characterized by k. In various embodiments, the calculated permeability of the acid reducing filter may include, but is not limited to, the values listed in Table 3, wherein the values have been calculated from the data used in creation of the waveform 700C. In addition, the flow rates of Table 3 are specific to an applied pressure of 606 Pascals and an area of 12.81 cm$^2$.

TABLE 3

Tabulated flow rate and permeability values for cellulose variation.

| Amount of Cellulose (mL) | Flow Rate (mL/s) | k (Total) (cm$^2$) | k (Paper) (cm$^2$) |
|---|---|---|---|
| 0 | 48.9 (±1.8) | 5.6 × 10$^{-7}$ (±2.1 × 10$^{-8}$) | — |
| 40 | 3.4 (±0.3) | 3.9 × 10$^{-8}$ (±3.2 × 10$^{-9}$) | 3.2 × 10$^{-9}$ (±2.8 × 10$^{-10}$) |
| 60 | 2.2 (±0.1) | 2.5 × 10$^{-8}$ (±1.3 × 10$^{-9}$) | 2.0 × 10$^{-9}$ (±1.1 × 10$^{-10}$) |
| 80 | 1.1 (±0.1) | 1.3 × 10$^{-8}$ (±1.1 × 10$^{-9}$) | 1.0 × 10$^{-9}$ (±8.7 × 10$^{-11}$) |
| 100 | 0.8 (±0.1) | 9.1 × 10$^{-9}$ (±7.1 × 10$^{-10}$) | 7.3 × 10$^{-10}$ (±1.3 × 10$^{-10}$) |

A trend 706C of the waveform 700C demonstrates an inverse relationship between flow rate 702C through and the volume of cellulose 704C added to the acid-reducing filter. Further, calculations of permeability in relation to cellulose, listed in Table 2, demonstrate an inverse relationship between permeability of and the volume of cellulose 704C added to the acid-reducing filter. In various embodiments, flow rate-cellulose added relations and flow rate-permeability relations may enable more accurate and precise production and/or performance of the acid-reducing filter.

In one or more embodiments, the above analysis methods may be used in an additional analysis, wherein the additional analysis characterizes a relationship between the flow rate through the acid-reducing filter and a mass (e.g., in grams) of one or more mineral components (e.g., as described previously herein) added to the filter substrate in fabrication, as described herein, of the respective acid-reducing filter. In various embodiments, the additional analysis further characterizes a relationship between permeability of the acid reducing filter and the mass of one or more mineral components. In one or more embodiments, the additional analysis prepares the acid-reducing filter with a standard volume of cellulose. In at least one embodiment, the standard volume of cellulose may be 60 mL. The additional analysis performs tests including iterative loading of the mass of one or more mineral components.

In one or more embodiments, the relationship between flow rate through the filter and the mass of one or more mineral components may be inverse. In one or more embodiments, the relationship between permeability and the mass of one or more mineral components may be inverse (e.g., more mass of one or more mineral components reduces permeability of the acid-reducing filter). In various embodiments, a value of permeability and/or a value of flow rate for the given mass of one or more mineral components may be captured in Table 4. In addition, Table 4 flow rates are specific to an applied pressure of 606 Pascals and an area of 12.81 cm$^2$. The permeability of the acid-reducing filter may be given by k, where k is independent of pressure and area. In at least one embodiment, performance of the acid-reducing filter may be characterized by k. In one or more embodiments, the mass of one or more mineral components may not significantly affect the flow rate or permeability of the acid-reducing filter. In at least aspect, the lack of significant effect may be due to the small particle size of the one or more components (e.g., as described in FIG. 2). In various embodiments, an acid-reducing filter of the present technology may include a filter permeability from about $1.7 \times 10^{-8}$ cm$^2$ to about $5.6 \times 10^{-7}$ cm$^2$. For example, in any embodiment herein, the filter permeability may be about $1.7 \times 10^{-8}$ cm$^2$, about $2.5 \times 10^{-8}$ cm$^2$, about $2.8 \times 10^{-8}$ cm$^2$, about $3.2 \times 10^{-8}$ cm$^2$, about $4.2 \times 10^{-8}$ cm$^2$, about $5.6 \times 10^{-7}$ cm$^2$, or any range including and/or in between any two of the preceding values. In at least one embodiment, an acid-reducing filter of the present technology may include a mineral blend (e.g., in a mineral blend layer and/or integrally formed into a substrate of the acid-reducing filter) including 60 wt % MgCO$_3$ and 40 wt % CaCO$_3$, wherein the acid-reducing filter exhibits a filter permeability value of about $2.7 \times 10^{-8}$ cm$^2$. In some embodiments, the permeability of the previous sentence may be exhibited by one or more acid-reducing filters including a mineral blend, wherein the mineral blend includes calcium carbonate in an amount from about 25 wt % to about 40 wt % and magnesium carbonate in an amount from about 60 wt % to about 75 wt %.

Figure 9A:
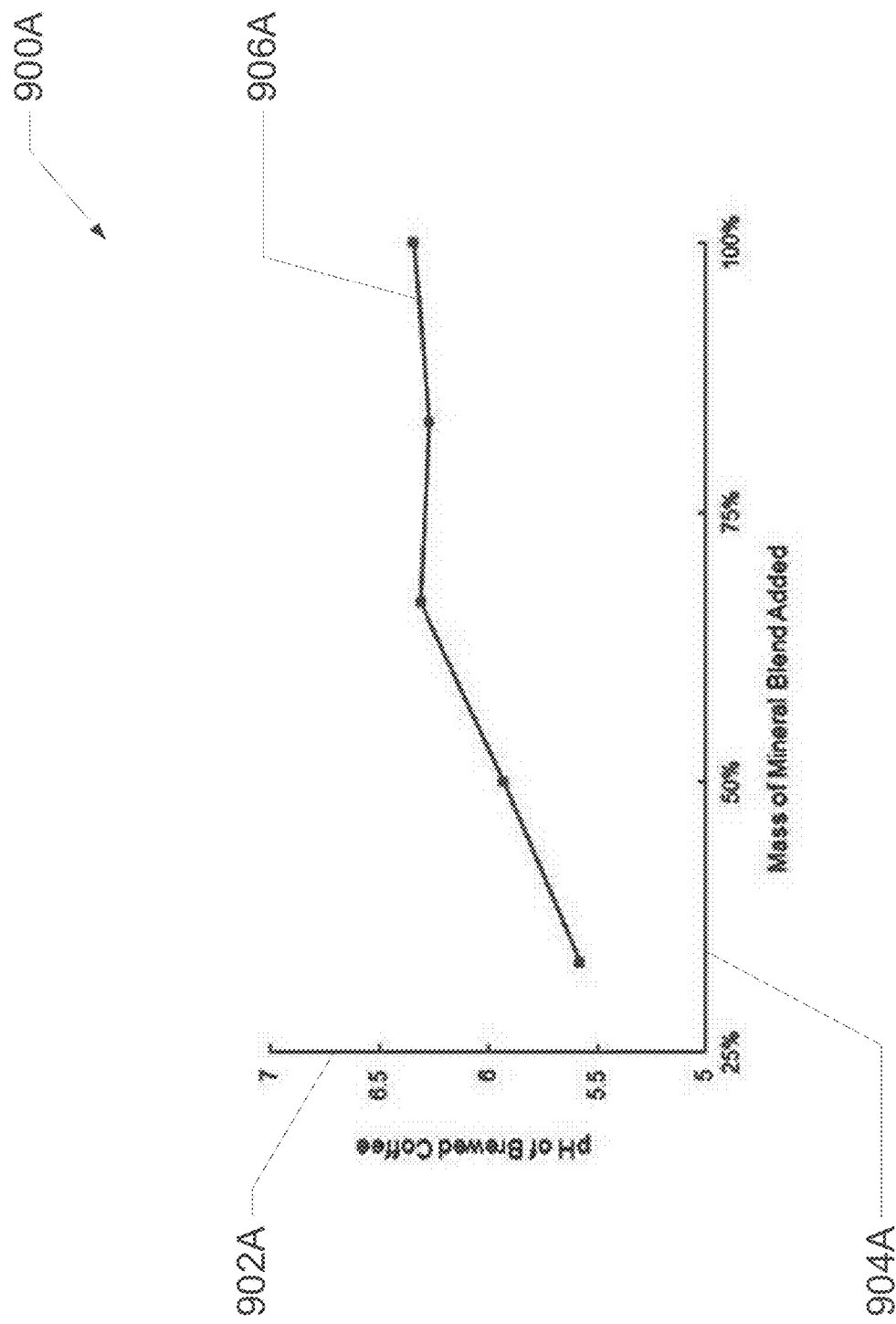
FIGS. 9A-9B show waveforms depicting relationships between pH and one or more variables, according to one embodiment.
Figure 9B:
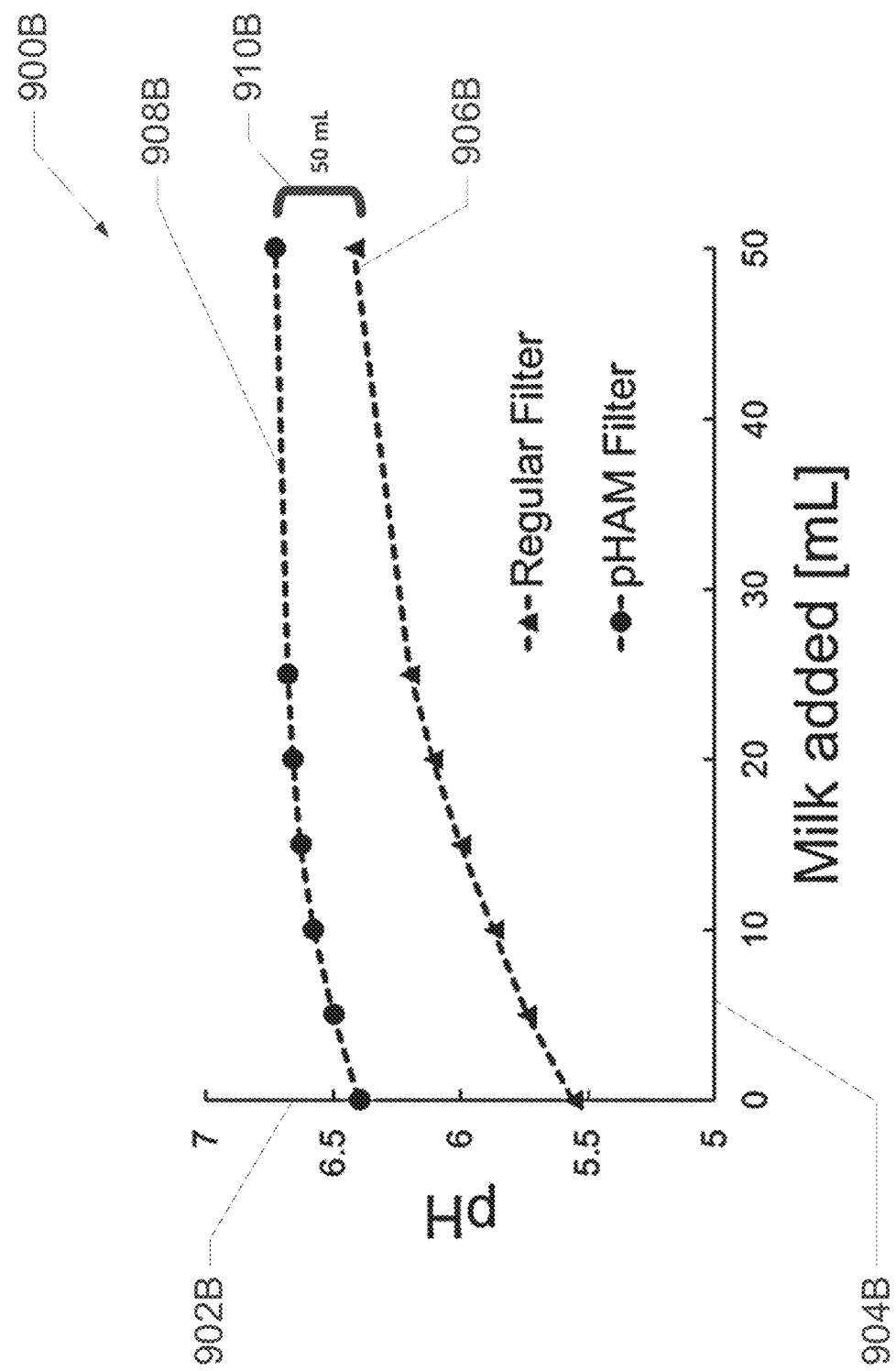

FIG. 9B illustrates the chart 900B and relates, in one aspect, a volume of milk 904B added to coffee brewed with a regular (e.g., not acid-reducing) filter to a pH 902B. A trend 906B of the chart 900B demonstrates a direct relationship between the volume of milk 904B added and the pH 902B of the coffee to which the milk was added. A curve 908B reports the pH 902B of coffee brewed with an acid-reducing filter (e.g., at the same instance of respective coffee brewed without, but with milk added). In various embodiments, the volume of milk 904B was slowly added to 100 mL of coffee brewed with the regular filter. A comparison 910B illustrates a disparity between the trend 906B and the curve 908B, and indicates that 50 mL of milk in only 100 mL of coffee is required to achieve the same pH as coffee brewed with the acid-reducing filter. The comparison 910B thus further indicates significant dilution of coffee brewed with the control filter is needed to achieve comparable acid neutralization as coffee brewed with the acid-reducing filter.

The present invention, thus generally described, may be understood more readily by reference to the following examples, which are not intended to be limiting of the present invention

TABLE 4

Tabulated flow rate and permeability values for mineral loading variation.

| | Flow Rate (mL/s) | k (Total) (cm$^2$) | K (Paper) (cm$^2$) |
|---|---|---|---|
| CaCO3 (g) | | | |
| 0 | 48.9 (±1.8) | $5.6 \times 10^{-7}$ (±2.1 × 10$^{-8}$) | — |
| 0.25 | 2.4 (±0.2) | $2.8 \times 10^{-8}$ (±2.7 × 10$^{-9}$) | $2.3 \times 10^{-9}$ (±2.3 × 10$^{-10}$) |
| 0.5 | 2.2 (±0.1) | $2.5 \times 10^{-8}$ (±1.4 × 10$^{-9}$) | $2.0 \times 10^{-9}$ (±1.2 × 10$^{-10}$) |
| 0.75 | 1.5 (±0.3) | $1.7 \times 10^{-8}$ (±3.0 × 10$^{-9}$) | $1.3 \times 10^{-9}$ (±2.5 × 10$^{-10}$) |
| MgCO3 (g) | | | |
| 0 | 48.9 (±1.8) | $5.6 \times 10^{-7}$ (±2.1 × 10$^{-8}$) | — |
| 0.25 | 2.8 (±0.4) | $3.2 \times 10^{-8}$ (±4.4 × 10$^{-9}$) | $2.6 \times 10^{-9}$ (±3.8 × 10$^{-10}$) |
| 0.5 | 3.7 (±0.3) | $4.2 \times 10^{-8}$ (±3.6 × 10$^{-9}$) | $3.5 \times 10^{-9}$ (±3.2 × 10$^{-10}$) |

Figure 8:
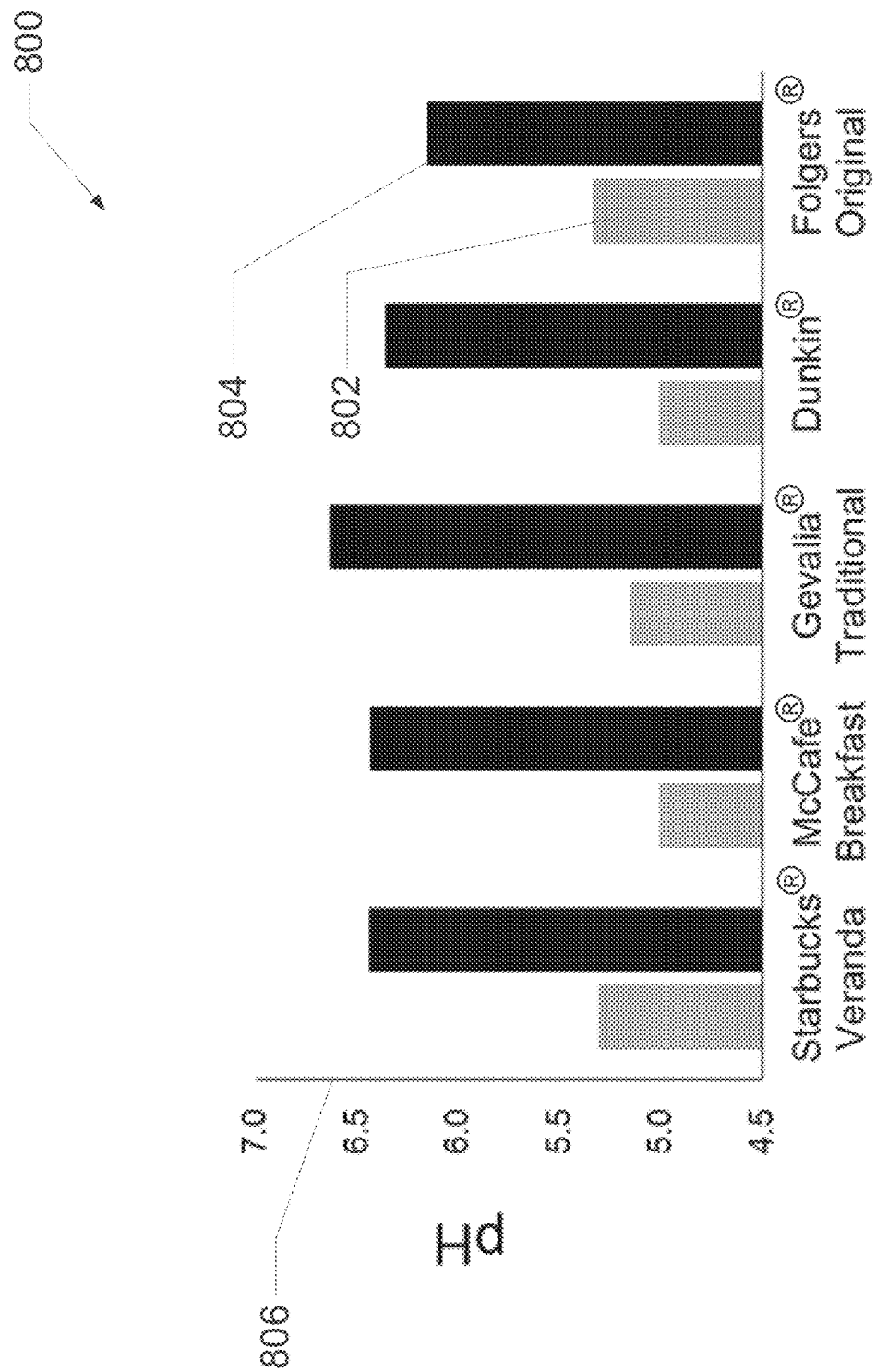
FIG. 8 shows a bar graph depicting relationships between pH of coffee brewed with a regular filter and pH of coffee brewed with an acid-reducing filter according to one embodiment.

FIG. 8 illustrates a bar graph 800 and relates coffee pH to coffee type for one or more respective brands of coffee. The bar graph 800 further characterizes the relation between a pH of Folgers® regular coffee brewed with a regular (e.g., control) coffee filter 802 (e.g., grey bars) to a pH 804 of coffee brewed with an acid-reducing filter, such as the acid-reducing filter 100 of FIG. 1. In various embodiments, the bar graph 800 indicates a pH relation 806. The pH relation 806 demonstrates pH 802 is consistently lower than the pH 804, thus coffee brewed with the acid-reducing filter may be consistently less acidic than coffee brewed with a regular coffee filter. In one or more embodiments, the pH relation 806 holds true for all brands of coffee depicted in FIG. 8. FIG. 9 illustrates one or more waveforms, wherein the one or more waveforms present relationships between pH and one of more variables. FIG. 9A illustrates a waveform 900A and relates a mass of mineral blend (e.g., the one or more mineral components described previously herein) 902A added (e.g., to a filter substrate in the fabrication of one or more acid-reducing filters, similar to the acid-reducing filter 100 of FIG. 1) to a pH of coffee 904A brewed from one or more acid-reducing filters. In various embodiments, the mass of mineral blend 902A may be expressed as a percentage (e.g., as is the case in FIG. 9). A trend 906A of the waveform 900A demonstrates a direct relationship between the mass of mineral blend added 902A and the pH of coffee 904a.

Example 1: pH Testing

To quantify the acidity of brewed coffee prepared with filters of the present technology, a VWR Symphony pH meter was used. The pH meter was calibrated and samples tested according to ASTM E70-07. Using a standard brewing method and a filter paper prepared according to one or more the methods described previous herein, 40 g of packaged medium roast 100% Premium Arabica coffee grounds was added to 475 mL of water and prepared in a 12-cup commercial coffee maker. The pH of each coffee sample was tested immediately after brewing and tested again once the coffee had cooled to room temperature. Results are recorded in Table 5.

TABLE 5 pH Testing of hand sheets

| Filter | Mineral Dosage Level | pH Immediately After Brewing | pH at Room Temperature |
|---|---|---|---|
| | Control | 5.15 | 5.13 |
| A | MgCO$_3$—41.67% CaCO$_3$—20.83% | 5.55 | 5.48 |

TABLE 5-continued pH Testing of hand sheets

| Filter | Mineral Dosage Level | pH Immediately After Brewing | pH at Room Temperature |
|---|---|---|---|
| B | MgCO$_3$—83.33% CaCO$_3$—41.67% | — | 5.75 |

**Mineral Dosage Level = weight % based on mass of fibers used to make the filter.

As provided in Table 5, the sample filters A successfully decreased the acidity of the brewed coffee beverage, showing a pH increase of 0.4 units immediately after brewing. Upon cooling to room temperature, sample filters A and B showed a pH increase of 0.35 and 0.62 pH units measured at room temperature. In addition, the Table 5 pH increases, when normalized for mineral retention of the filter, are consistent with pH increases observed in acid-reducing filters produced by other methods (e.g., spray deposition, vacuum deposition, etc.).

Sample filters were prepared with a 90 mL cellulose stock using a method described previously herein. The mineral blend included 66 wt % MgCO$_3$ and 33 wt % CaCO$_3$, where the mass of the mineral blend loaded into the filter was varied. Using a standard brewing method and a filter paper as described above, 40 g of various packaged blend coffee grounds were added to 475 mL of water and prepared in a 12-cup commercial coffee maker. A pH meter was used to determine the pH of each brewed coffee sample. The pH of coffee samples brewed with the control filter had a pH ranging from 5.0 to 5.3, whereas the coffee samples brewed with the exemplary acid-reducing filter described above exhibited pH values ranging from 6.2-6.6. Coffee samples treated with the exemplary acid-reducing filter showed an average pH in increase of 1.2 units. Accordingly, packaged coffee beverages were successfully acid-reduced prepared using acid-reducing filters prepared according to the present technology.

Acid-reducing filters were prepared according one or more of the methods described previously herein. Various masses of the mineral blend were incorporated into each acid-reducing filter at 66 wt % MgCO$_3$ and 33 wt % CaCO$_3$. Using a standard brewing method and a filter paper as described above, 40 g of various packaged blend coffee grounds were added to 475 mL of water and prepared in a 12-cup commercial coffee maker. A pH meter was used to determine the pH of each brewed coffee sample and pH increased across each mass amount until a steady state pH was observed.

Example 2: Insolubility Testing

A commercial coffee maker was loaded with a sample acid-reducing filter prepared according to one or more of the methods previously described herein, water, but no grounds. The pot was brewed as normal, and the water was collected in a beaker with a known mass. The collected water in the beaker was then boiled off, and the final mass of the beaker was measured. The residual mass after boiling gave a mineral solubility of 42 mg/L for the exemplary acid-reducing filter. Thus, the mineral blend layer of the sample acid-reducing filter prepared according to the present technology is insoluble.

Example 3: Taste Testing

Test 1:
To measure the impact of the prototype filter on taste, double blind taste testing was performed. Participants were given one 3 fluid ounce cup of packaged 100% Arabica medium roast coffee brewed with a regular filter (control) and a matching cup brewed with an acid-reducing filter, such as the filter 100 of FIG. 1. Twenty participants were asked to indicate which coffee they would prefer to drink between the control filter and acid-reducing filter brewed coffee samples. Test 1 demonstrated 79% of the participants either preferred the coffee brewed with the acid-reducing filter (49%) or had no preference (30%).

Test 2:
Random participants were asked to sample two different coffees. One coffee was brewed with an acid-reducing filter, such as the filter 100 of FIG. 1, and the other coffee was brewed with regular coffee filter (control). The testing was single blind, and the participants did not know any information regarding what was different between the two coffees. The participants would taste 1.5 oz. of each coffee and score each coffee on a scale from 1-10. 1 was the lowest score and 10 was the greatest, meaning a greater score indicated a better coffee to that participant. The participants wrote the score for each coffee on a slip of paper, and placed that slip in a box in front of the coffee dispenser for that particular coffee. A total of 54 participants rated the two coffees and the results showed that the average taste score for coffee brewed with the acid reducing filter was 6.7/10, whereas the average score of coffee brewed with a regular filter was 5.8/10.

Accordingly, coffee beverages brewed according to the method of the present technology using acid-reducing filters described herein exhibited improved taste over regular brewed coffee.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the ordinary and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

In at least one embodiment, acid-reducing mineral compositions discussed herein may be used in combination with tea bags, single serve beverage pods, and the like. In one such embodiment, an acid-reducing mineral composition may be combined with structural materials or added to a single-serve beverage pod. As an example, a coffee pod may be lined with or a surface of the same may be coated with an acid-reducing substance as discussed herein (e.g., wherein the single-serve beverage pod is constructed of plastic or another non-permeable material).

As an additional example, a portion of the single-serve beverage pod may include a mesh, fiber, or cellulose structure for allowing water to pass-through the same. In this additional example, the mesh, fiber, or cellulose structure may be bound with a composition including the mineral composition and one or more cellulose materials.

CONCLUSION

While various aspects have been described in the context of a preferred embodiment, additional aspects, features, and methodologies of the claimed methods and products (e.g., of the claimed methods) will be readily discernible from the description herein, by those of ordinary skill in the art. Many embodiments and adaptations of the disclosure and claimed methods and products (e.g., of the claimed methods) other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed methods and products (e.g., of the claimed methods). It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed methods and products (e.g., of the claimed methods). In addition, some steps may be carried out simultaneously, contemporaneously, or in synchronization with other steps.

The embodiments were chosen and described in order to explain the principles of the claimed methods and products (e.g., of the claimed methods) and their practical application so as to enable others skilled in the art to utilize the methods and products, and various embodiments and with various modifications as are suited to the particular use contemplated. Alternative embodiments will become apparent to those skilled in the art to which the claimed systems pertain without departing from their spirit and scope. Accordingly, the scope of the claimed methods and products (e.g., of the claimed methods) is defined by the appended claims rather than the foregoing description and the exemplary embodiments described therein.

What is claimed is:

1. A method for preparing an acid-reducing filter comprising:
    depositing a mineral blend layer to a filter substrate, wherein:
        the mineral blend layer comprises calcium carbonate and magnesium carbonate at a weight ratio of about 1:10 to about 10:1;
        the mineral blend layer is free of soluble halide or hydroxide salts of alkali or alkaline earth metals; and
        the mineral blend layer is insoluble in water.

2. The method of claim 1, wherein the calcium carbonate is present in an amount from about 25 wt % to about 40 wt % of the mineral blend layer.

3. The method of claim 2, wherein the magnesium carbonate is present in an amount from about 60 wt % to about 75 wt % of the mineral blend layer.

4. The method of claim 3, wherein the magnesium carbonate and calcium carbonate of the mineral blend layer are present in approximate amounts of 66 wt % and 33 wt %, respectively, and wherein the acid-reducing filter comprises a filter permeability of about $2.7 \times 10^{-8}$ cm$^2$.

5. The method of claim 3, wherein the mineral blend layer further comprises insoluble fiber materials selected from the group consisting of virgin bleached cellulose fibers, virgin unbleached cellulose fibers, recycled unbleached cellulose fibers, hemp, synthetic fibers, nylon, biofibers, or mixtures of two or more thereof.

6. The method of claim 5, wherein the method further comprises depositing one or more coating layers comprising insoluble fiber materials.

7. The method of claim 6, wherein the method further comprises:
    depositing a first coating layer to the filter substrate before depositing the mineral blend layer; and depositing a second coating layer to the mineral blend layer, wherein:
the mineral blend layer is disposed between the first coating layer and the second coating layer; and
the first coating layer and the second coating layer comprise insoluble fiber materials.

8. The method of claim 7, wherein the filter substrate is a coffee filter paper.

9. The method of claim 1, wherein the acid reducing filter produced comprises a flow rate from about 5.0-10.0 milliliters per second.

10. A method for preparing an acid-reducing filter comprising:
combining a mineral blend comprising calcium carbonate, magnesium carbonate, and insoluble fiber materials with a solvent to obtain a material matrix;
depositing a layer of the material matrix to a substrate; and
separating the solvent from the material matrix, wherein:
the mineral blend has a weight ratio of calcium carbonate to magnesium carbonate of about 1:10 to about 10:1 by weight of the mineral blend, is free of soluble halide or hydroxide salts of alkali or alkaline eath metals, and is insoluble in water.

11. The method of claim 10, wherein the magnesium carbonate and calcium carbonate of the mineral blend are present in amounts ranging from about 60 wt % to about 75 wt %, and about 25 wt % to about 40 wt %, respectively, and wherein the acid-reducing filter comprises a filter permeability of about $2.7 \times 10^{-8}$ cm$^2$.

12. The method of claim 10, wherein the substrate is selected from the group consisting of felt, wool, micron-grade filter paper, and non-woven water-permeable fibrous material.

13. The method of claim 12, wherein the solvent is water.

14. The method of claim 13, wherein the insoluble fiber material is selected from the group consisting of virgin bleached cellulose fibers, virgin unbleached cellulose fibers, recycled unbleached cellulose fibers, hemp, synthetic fibers, nylon, biofibers, or mixtures of two or more thereof.

15. The method of claim 14, wherein the weight ratio of calcium carbonate to magnesium carbonate is from about 1:5 to about 5:1.

16. The method of claim 14, wherein the weight ratio of calcium carbonate to magnesium carbonate is from about 1:4 to about 2:3.

17. The method of claim 14, wherein the mineral blend is integrally and homogeneously formed with the substrate.

18. The method of claim 16, wherein the mineral blend further comprises calcium stearate, calcium fluoride, magnesium stearate, or mixtures of two or more thereof.

\* \* \* \* \*